United States Patent
Kim et al.

(10) Patent No.: US 9,686,058 B2
(45) Date of Patent: Jun. 20, 2017

(54) METHOD AND APPARATUS FOR CONTROLLING INTER-CELL INTERFERENCE IN WIRELESS COMMUNICATION SYSTEM

(71) Applicant: LG ELECTRONICS INC., Seoul (KR)

(72) Inventors: Eunsun Kim, Anyang-si (KR); Hanjun Park, Anyang-si (KR); Hanbyul Seo, Anyang-si (KR); Seungmin Lee, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/354,514

(22) PCT Filed: Oct. 26, 2012

(86) PCT No.: PCT/KR2012/008874
§ 371 (c)(1),
(2) Date: Apr. 25, 2014

(87) PCT Pub. No.: WO2013/062362
PCT Pub. Date: May 2, 2013

(65) Prior Publication Data
US 2014/0254537 A1  Sep. 11, 2014

Related U.S. Application Data

(60) Provisional application No. 61/551,449, filed on Oct. 26, 2011, provisional application No. 61/596,130, (Continued)

(51) Int. Cl.
*H04L 12/66* (2006.01)
*H04L 5/00* (2006.01)
(Continued)

(52) U.S. Cl.
CPC .......... *H04L 5/0032* (2013.01); *H04J 11/005* (2013.01); *H04J 11/0053* (2013.01);
(Continued)

(58) Field of Classification Search
CPC ...................................................... H04W 28/04
(Continued)

(56) References Cited

U.S. PATENT DOCUMENTS 8,755,807 B2   6/2014  Gorokhov et al.
2008/0167040 A1  7/2008  Khandekar et al.
(Continued)

FOREIGN PATENT DOCUMENTS

JP    2009-081872     4/2009
KR    10-2009-0046686  5/2009
(Continued)

OTHER PUBLICATIONS

PCT International Application No. PCT/KR2012/008874, Written Opinion of the International Searching Authority dated Mar. 4, 2013, 17 pages.
(Continued)

*Primary Examiner* — Samina Choudhry
(74) *Attorney, Agent, or Firm* — Lee, Hong, Degerman, Kang & Waimey

(57) ABSTRACT

A method for transmitting reduced power-almost blank subframe (r-ABS) setting information from a first cell to a second cell, according to one embodiment of the present invention, comprises a step of the first cell transmitting to the second cell r-ABS pattern information for indicating the r-ABS which is setup by the first cell, and r-ABS power indication information for indicating transmission power of a physical downlink shared channel (PDSCH) of the first cell from the r-ABS, wherein the PDSCH transmission
(Continued)

power of the first cell can be set to a transmission power which is low compared to a common subframe.

13 Claims, 17 Drawing Sheets

Related U.S. Application Data filed on Feb. 7, 2012, provisional application No. 61/600,704, filed on Feb. 19, 2012, provisional application No. 61/601,517, filed on Feb. 21, 2012.

(51) Int. Cl.
| | |
|---|---|
| *H04W 52/24* | (2009.01) |
| *H04J 11/00* | (2006.01) |
| *H04W 52/40* | (2009.01) |
| *H04W 24/08* | (2009.01) |
| *H04W 24/10* | (2009.01) |
| *H04W 72/04* | (2009.01) |
| *H04W 52/32* | (2009.01) |
| *H04W 52/38* | (2009.01) |
| *H04W 52/36* | (2009.01) |

(52) U.S. Cl.
CPC .......... *H04L 5/0035* (2013.01); *H04L 5/0053* (2013.01); *H04L 5/0073* (2013.01); *H04W 24/08* (2013.01); *H04W 24/10* (2013.01); *H04W 52/243* (2013.01); *H04W 52/32* (2013.01); *H04W 52/40* (2013.01); *H04W 72/042* (2013.01); *H04W 72/0426* (2013.01); *H04W 52/367* (2013.01); *H04W 52/38* (2013.01); *H04W 72/0446* (2013.01); *Y02B 60/50* (2013.01)

(58) Field of Classification Search
USPC .......................................................... 370/329
See application file for complete search history.

(56) References Cited

U.S. PATENT DOCUMENTS

| | | |
|---|---|---|
| 2010/0323745 A1 | 12/2010 | Chen |
| 2011/0116437 A1 | 5/2011 | Chen et al. |
| 2011/0249642 A1 | 10/2011 | Song et al. |
| 2012/0046056 A1* | 2/2012 | Luo ........................ H04J 11/005 455/502 |
| 2012/0087324 A1 | 4/2012 | Kiyoshima et al. |
| 2012/0176884 A1 | 7/2012 | Zhang et al. |
| 2012/0231790 A1* | 9/2012 | Lindoff ................. H04W 48/16 455/434 |
| 2012/0327884 A1 | 12/2012 | Seo et al. |
| 2013/0153298 A1* | 6/2013 | Pietraski ................. H04L 5/001 175/45 |
| 2013/0244604 A1 | 9/2013 | Yellin |
| 2014/0050154 A1* | 2/2014 | Gunnarsson ............ H04L 41/14 370/328 |
| 2014/0086203 A1 | 3/2014 | Furuskar et al. |
| 2014/0126529 A1 | 5/2014 | Ahn et al. |
| 2014/0126530 A1 | 5/2014 | Siomina et al. |

FOREIGN PATENT DOCUMENTS

| | | |
|---|---|---|
| KR | 10-2009-0076745 | 7/2009 |
| KR | 10-2011-0007197 | 1/2011 |
| KR | 10-2011-0040711 | 4/2011 |
| WO | 2010/148366 | 12/2010 |
| WO | 2011/019835 | 2/2011 |
| WO | 2011/034960 | 3/2011 |
| WO | 2011/119973 | 9/2011 |
| WO | 2013/000311 | 1/2013 |

OTHER PUBLICATIONS

PCT International Application No. PCT/KR2012/008862, Written Opinion of the International Searching Authority dated Feb. 25, 2013, 16 pages.
United States Patent and Trademark Office U.S. Appl. No. 14/353,446, Office Action dated Dec. 23, 2015, 13 pages.
United States Patent and Trademark Office U.S. Appl. No. 14/353,446, Final Office Action dated May 20, 2016, 13 pages.
United States Patent and Trademark Office U.S. Appl. No. 14/353,446, Office Action dated Jul. 28, 2016, 25 pages.
Potevio, "Discussion on Scenarios of Carrier Based HetNet ICIC," 3GPP TSG-RAN3 Meeting #73, R3-112062, Aug. 2011, 3 pages.
3rd Generation Partnership Project (3GPP), "Technical Specification Group Radio Access Network; Evolved Universal Terrestrial Radio Access Network (E-UTRAN); X2 application protocol (X2AP) (Release 10)," 3GPP TS 36.423 V10.1.0, Mar. 2011, 132 pages.
Ericsson, "Introduction of eICIC support in RAN3 specifications," 3GPP TSG-RAN WG3 #70, R3-103494, Nov. 2010, 3 pages.
PCT International Application No. PCT/KR2012/008861, Written Opinion of the International Searching Authority dated Feb. 15, 2013, 14 pages.
United States Patent and Trademark Office U.S. Appl. No. 14/353,476, Office Action dated Nov. 10, 2015, 14 pages.
United States Patent and Trademark Office U.S. Appl. No. 14/353,446, Final Office Action dated Feb. 10, 2014, 10 pages.

* cited by examiner

FIG. 6
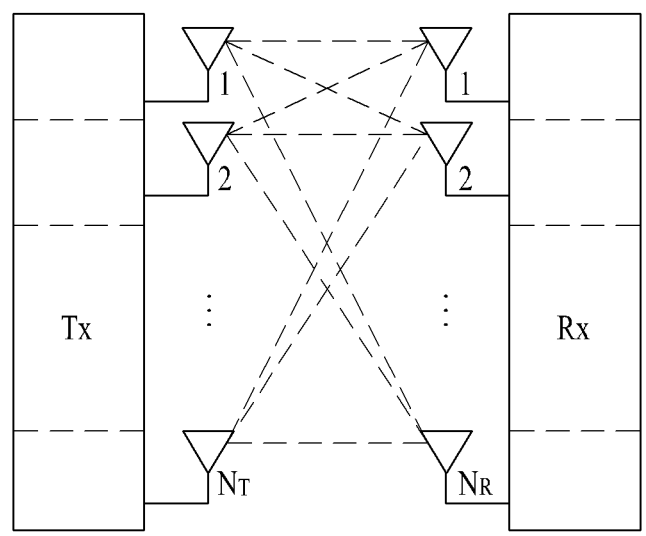
(a)
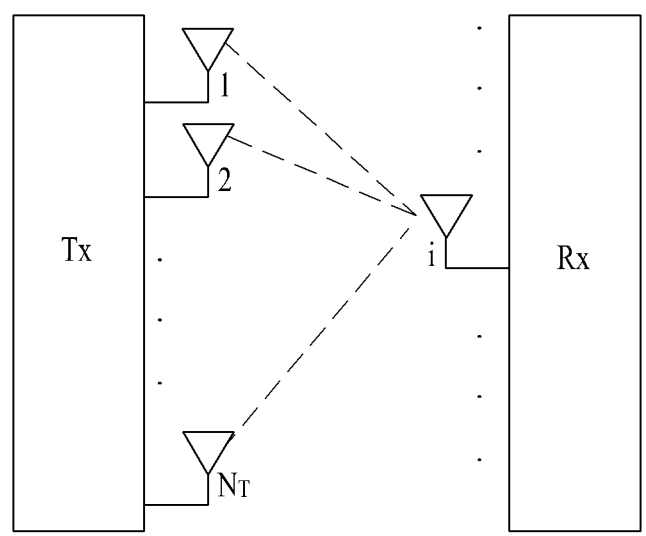
(b)

FIG. 7
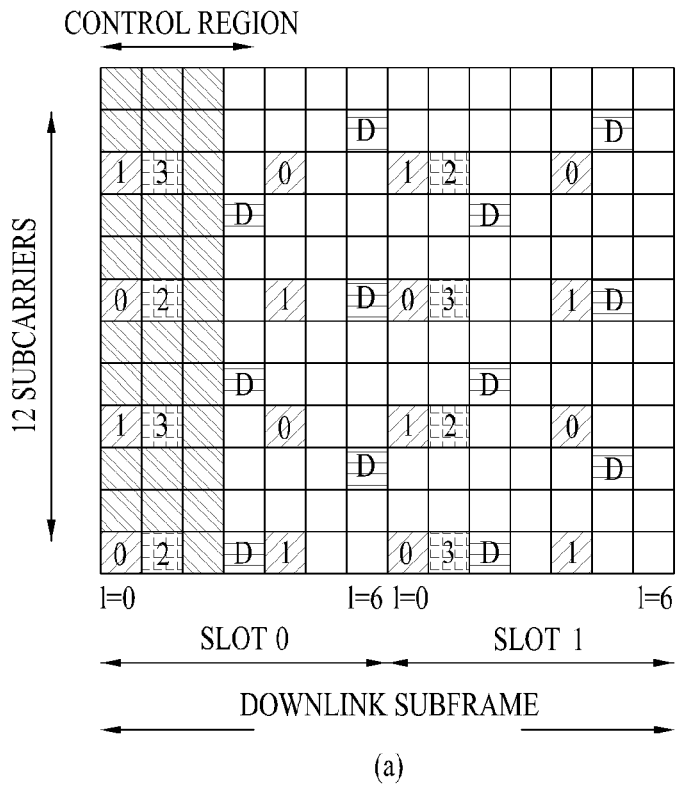
(a)
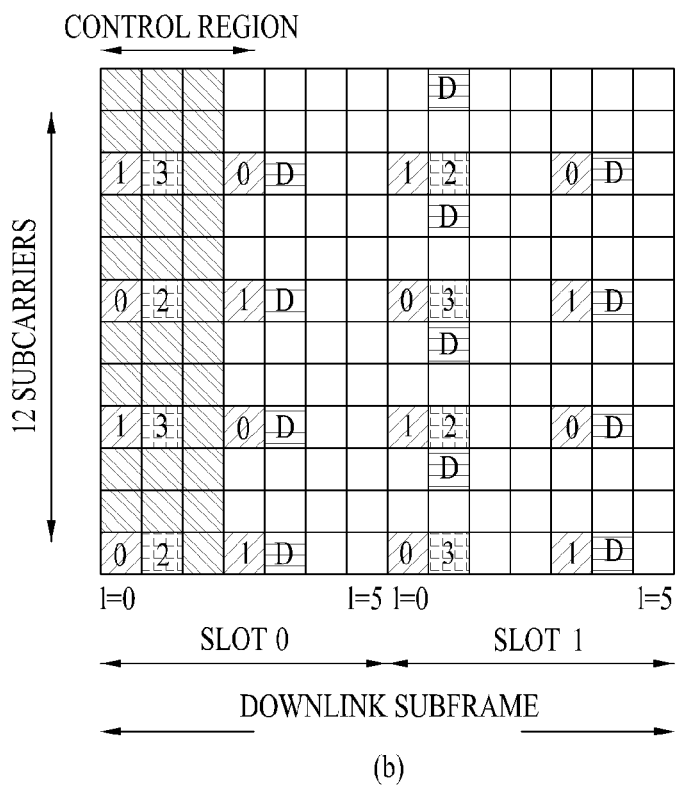
(b)

METHOD AND APPARATUS FOR CONTROLLING INTER-CELL INTERFERENCE IN WIRELESS COMMUNICATION SYSTEM

CROSS-REFERENCE TO RELATED APPLICATIONS

This application is the National Stage filing under 35 U.S.C. 371 of International Application No. PCT/KR2012/008874, filed on Oct. 26, 2012, which claims the benefit of U.S. Provisional Application Ser. No. 61/551,449, filed on Oct. 26, 2011, 61/596,130, filed on Feb. 7, 2012, 61/600,704, filed on Feb. 19, 2012 and 61/601,517, filed on Feb. 21, 2012, the contents of which are all hereby incorporated by reference herein in their entirety.

TECHNICAL FIELD

The following description relates to a wireless communication system and, more particularly, to a method and device for controlling and mitigating inter-cell interference in a wireless communication system.

BACKGROUND ART

FIG. 1 illustrates a heterogeneous network wireless communication system 100 including a macro eNB eNB1 and a micro eNB eNB2. In the specification, a heterogeneous network refers to a network in which a macro eNB 110 and a micro eNB 120 coexist while using the same radio access technology (RAT).

The macro eNB 110 refers to a normal eNB of a wireless communication system and has wide coverage (service provision area) and high transmit (Tx) power. The macro eNB 110 may be referred to as a macro cell. The micro eNB 120 may be referred to as a micro cell, a pico cell, a femto cell, a home eNB (HeNB), a relay, etc. The micro eNB 120 is a small version of the macro eNB and may independently operate while performing most functions of the macro eNB. The micro eNB is a non-overlay type eNB that may be overlaid in the coverage area of the macro eNB or in a shadow area which is not covered by the macro eNB. The micro eNB 120 may serve fewer UEs with narrower coverage and lower Tx power than the macro eNB 110.

A UE 130 may be directly served by the macro eNB 110 (the UE being referred to as a macro-UE in this case) or served by the micro eNB 120 (the UE being referred to as a micro-UE in this case). The UE 130 located in the coverage of the micro eNB 120 may be served by the macro eNB 110. FIG. 1 shows a case in which the UE 130 is connected to the micro eNB 120.

The micro eNB may be classified into two types: a closed subscriber group (CSG) micro eNB and an open access (OA) or open subscriber group (OSG) micro eNB according to whether UE access is restricted. The CSG micro eNB can serve only an authorized UE and the OSG micro eNB can serve all UEs without access restriction.

DISCLOSURE

Technical Problem

As illustrated in FIG. 1, when the UE 130 served by the micro eNB 120 in the heterogeneous network receives a desired signal from the micro eNB 120, the signal received by the UE 130 may be interfered by a strong signal from the macro eNB 110. Otherwise, when a UE served by the macro eNB is located in proximity to the micro eNB, a signal received by the UE from the macro eNB may be interfered by a strong signal from the micro eNB. This interference may be referred to as inter-cell interference. The aforementioned example relates to inter-cell interference generated on downlink from an eNB to a UE. Similarly, inter-cell interference may be generated on uplink from a UE to an eNB.

In a conventional wireless communication system, a cell that causes interference does not perform downlink data transmission in a specific subframe to mitigate interference applied to a neighboring cell. A method of improving system performance while reducing interference applied to a neighboring cell by performing downlink data transmission with reduced Tx power rather than not-performing downlink data transmission is under discussion. However, a method of signaling configuration of a subframe with reduced Tx power is not provided in the conventional wireless communication system.

An object of the present invention is to define pattern information and power indication information with respect to a subframe with reduced Tx power and to provide a method of exchanging such information between cells and a method of using the information for network operations with respect to UEs served by the cells.

The technical problems solved by the present invention are not limited to the above technical problems and those skilled in the art may understand other technical problems from the following description.

Technical Solution

The object of the present invention can be achieved by providing a method for transmitting reduced power-almost blank subframe (r-ABS) configuration information at a first cell to a second cell, the method including: transmitting, to the second cell, r-ABS pattern information for indicating an r-ABS set by the first cell from among a plurality of subframes, and r-ABS power indication information for indicating transmit (Tx) power of a physical downlink shared channel (PDSCH) of the first cell in the r-ABS, wherein the PDSCH Tx power of the first cell is set to Tx power lower than that with respect to a normal subframe.

In another embodiment of the present invention, provided herein is a method for receiving, at a second cell, r-ABS configuration information of a first cell, the method including: receiving, from the first cell, r-ABS pattern information for indicating an r-ABS set by the first cell from among a plurality of subframes, and r-ABS power indication information for indicating PDSCH Tx power of the first cell in the r-ABS, wherein the PDSCH Tx power of the first cell is set to Tx power lower than that with respect to a normal subframe.

In another embodiment of the present invention, provided herein is an eNodeB (eNB) of a first cell for transmitting r-ABS configuration information of the first cell to a second cell, including: a transmission module for transmitting a signal to an external device; a reception module for receiving a signal from an external device; and a processor for controlling the eNB, wherein the processor is configured to transmit, to the second cell through the transmission module, r-ABS pattern information for indicating an r-ABS set by the first cell from among a plurality of subframes, and r-ABS power indication information for indicating PDSCH Tx power of the first cell in the r-ABS, wherein the PDSCH Tx power of the first cell is set to Tx power lower than that with respect to a normal subframe.

In another embodiment of the present invention, provided herein is an eNB of a second cell for receiving r-ABS configuration information of a first cell, including: a reception module for receiving a signal from an external device; a transmission module for transmitting a signal to an external device; and a processor for controlling the eNB, wherein the processor is configured to receive, from the first cell through the reception module, r-ABS pattern information for indicating an r-ABS set by the first cell from among a plurality of subframes, and r-ABS power indication information for indicating PDSCH Tx power of the first cell in the r-ABS, wherein the PDSCH Tx power of the first cell is set to Tx power lower than that with respect to a normal subframe.

The following may be commonly applied to the above-described embodiments of the present invention.

The r-ABS pattern information may be set as a subset of an ABS pattern of the first cell.

The r-ABS pattern information and the r-ABS power indication information may be composed of bitmap information indicating a first Tx power value and a second Tx power value respectively applied to ABSs belonging to the ABS pattern.

The r-ABS pattern information may be composed of bitmap information indicating whether the first cell has scheduling intention for each ABS belonging to the ABS pattern.

The r-ABS power indication information may be configured in the form of an indicator indicating one of a first Tx power value and a second Tx power value when the same Tx power is applied to all ABSs belonging to the ABS pattern.

The r-ABS power indication information may include at least one of a user equipment (UE)-specific parameter $P_A'$ used to determine the ratio of cell-specific reference signal (CRS) energy per resource element (EPRE) to PDSCH EPRE on orthogonal frequency division multiplex (OFDM) symbols on which a CRS is not transmitted in the r-ABS, $\rho_A'$, an offset value $\delta_{power\text{-}offset}$ used to determine $\rho_A'$, and a subframe-specific parameter $P_B'$ used to determine the ratio of $\rho_A'$ to the ratio of CRS EPRE to PDSCH EPRE on OFDM symbols on which a CRS is transmitted in the r-ABS, $\rho_B'$.

The method may further include the first cell receiving feedback information about use of the r-ABS from the second cell.

The feedback information may include at least one of information for requesting Tx power of the first cell in the r-ABS to increase or decrease and information for requesting the number of r-ABSs to increase or decrease.

The method may further include transmitting the r-ABS pattern information and the r-ABS power indication information to a first user equipment (UE) served by the first cell through higher layer signaling.

The method may further include: performing at least one of measurement resource configuration, downlink scheduling and uplink scheduling for a second UE served by the second cell based on the r-ABS pattern information and the r-ABS power indication information; and transmitting information on at least one of the measurement resource configuration, downlink scheduling and uplink scheduling to the second UE.

The method may further include transmitting the r-ABS pattern information and the r-ABS power indication information to the second UE served by the second cell through higher layer signaling.

The above description and the following detailed description of the present invention are exemplary and are for additional explanation of the invention disclosed in the claims.

Advantageous Effects

According to the present invention, it is possible to define pattern information and power indication information with respect to a subframe with reduced Tx power and to provide a method of exchanging such information between cells and a method of using the information for network operations with respect to UEs served by the cells.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 6 illustrates configurations of wireless communication systems including multiple antennas;

FIG. 7 illustrates CRS and DRS patterns defined in 3GPP LTE;

BEST MODE

Figure 1:
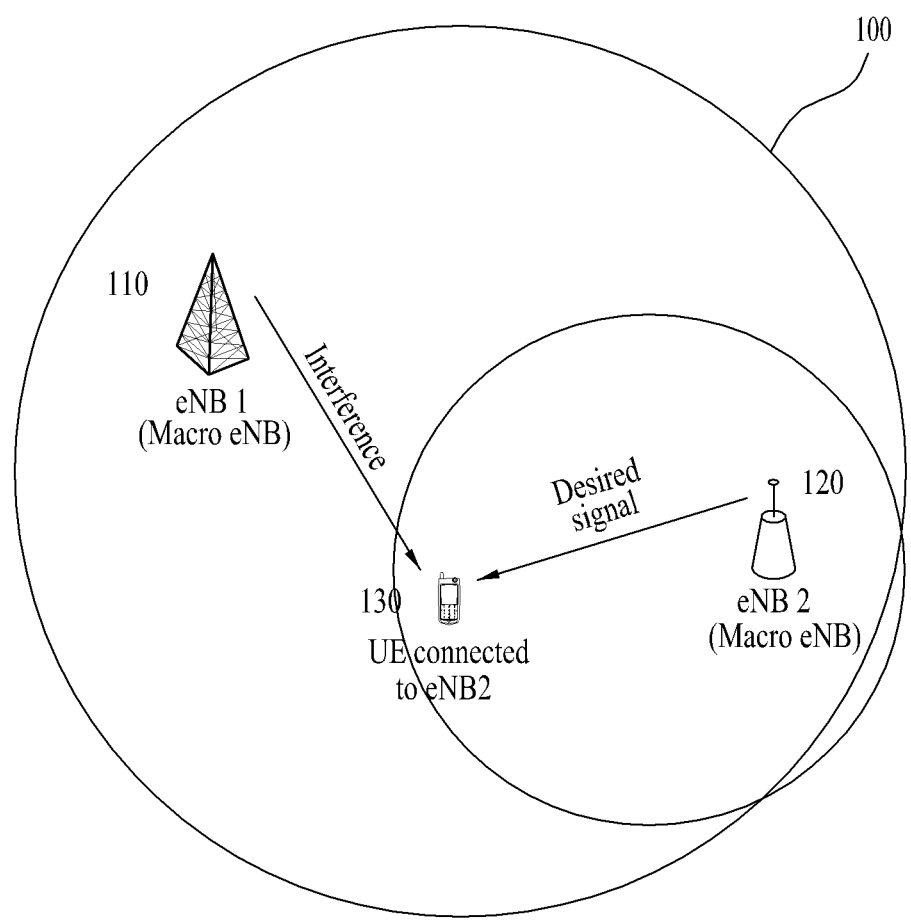
FIG. 1 illustrates a heterogeneous network wireless communication system.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

Figure 2:
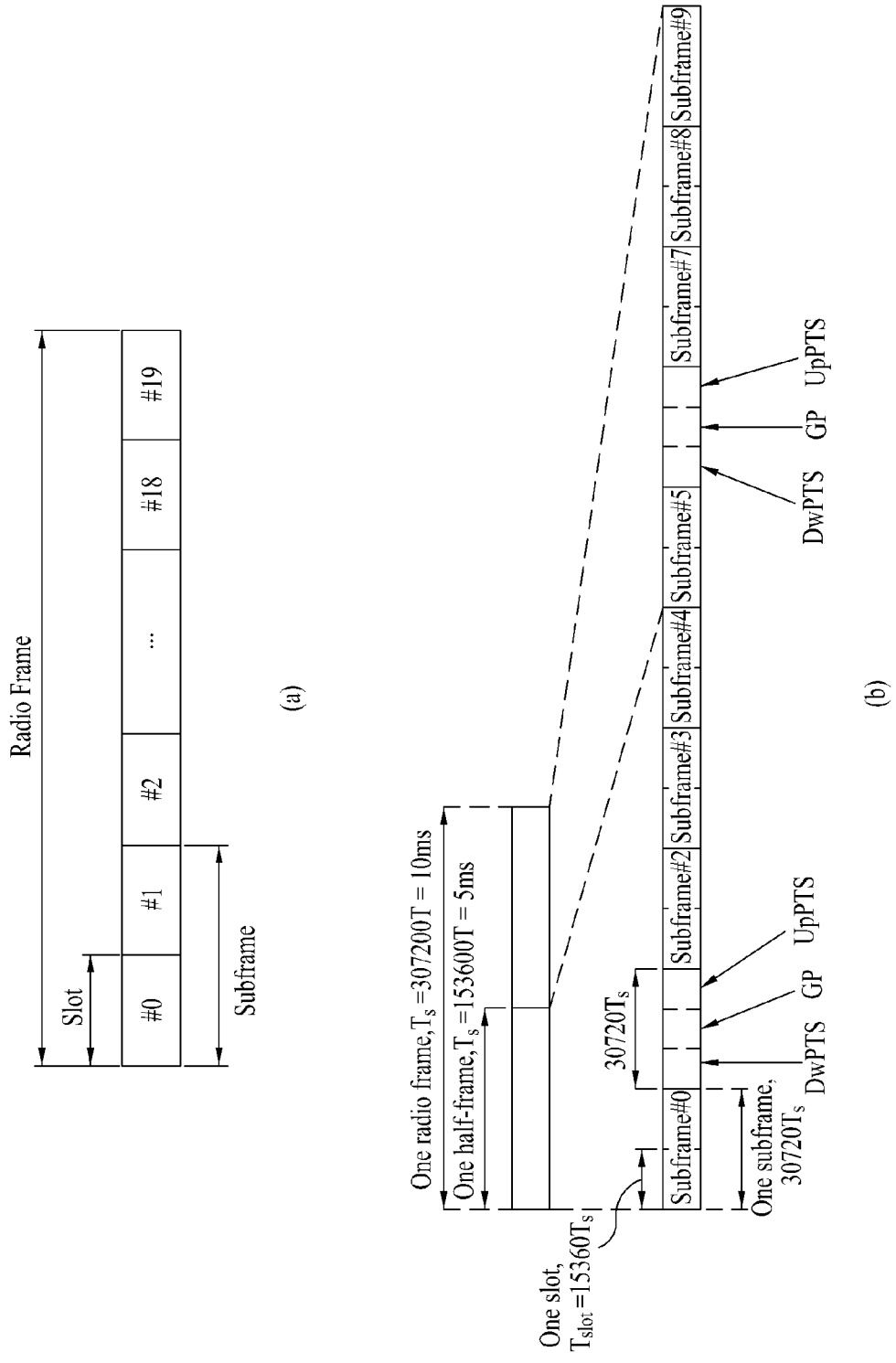
FIG. 2 illustrates a downlink radio frame structure.

A description will be given of a downlink radio frame structure with reference to FIG. 2.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 2(a) illustrates a type-1 radio frame structure. A downlink radio frame includes 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first two or three OFDM symbols in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 3:
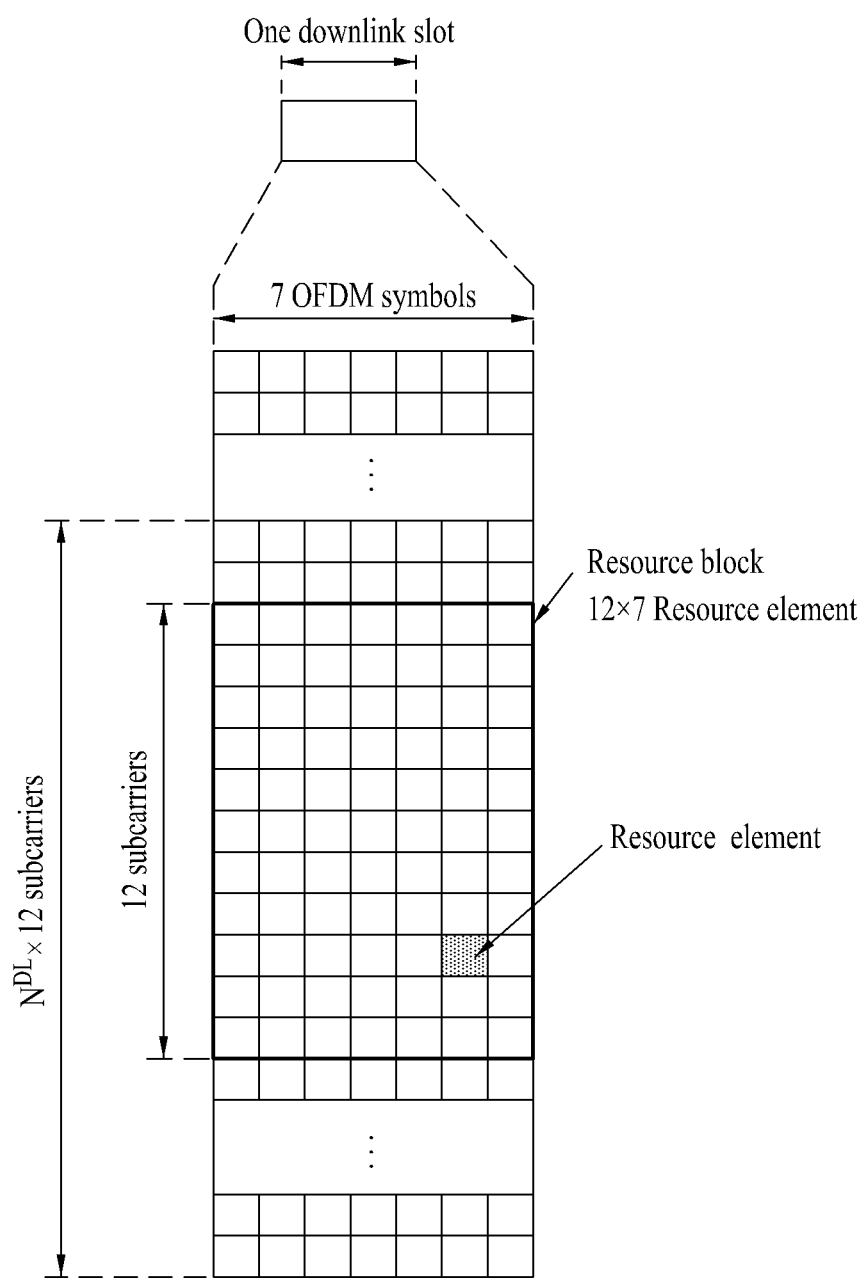
FIG. 3 illustrates a resource grid in a downlink slot.

FIG. 3 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 4:
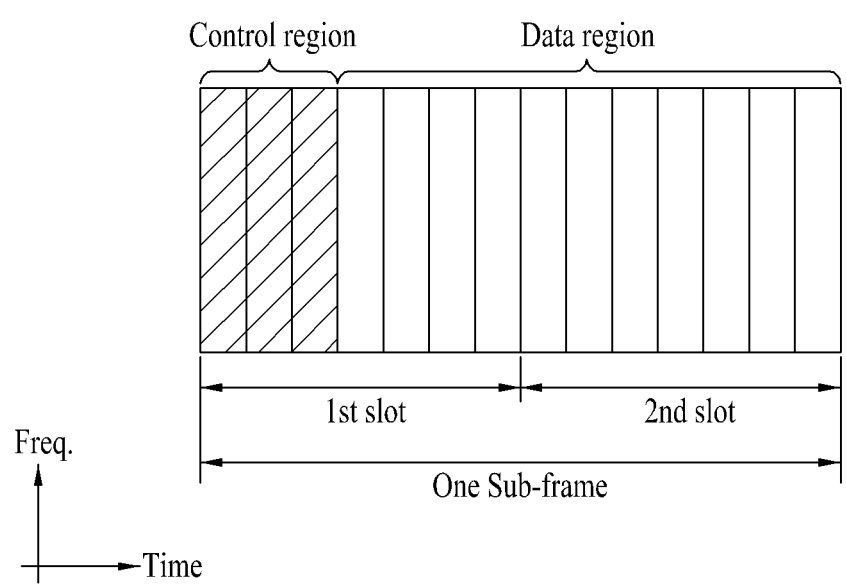
FIG. 4 illustrates a downlink subframe structure.

FIG. 4 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 5:
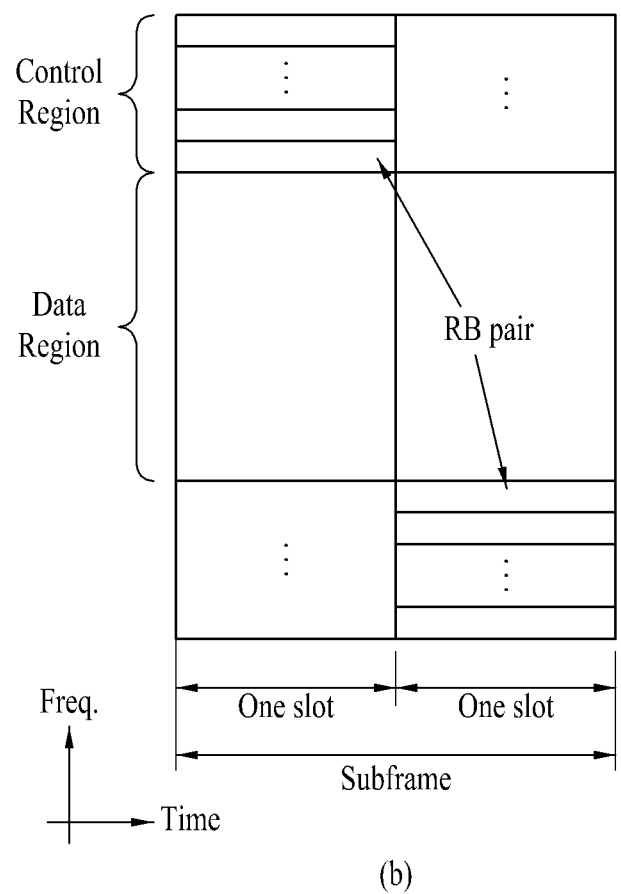
FIG. 5 illustrates an uplink subframe structure.

FIG. 5 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

MIMO System Modeling

FIG. 6 illustrates configurations of wireless communication systems including multiple antennas.

As shown in FIG. 6(a), when the number of transmit (Tx) antennas increases to NT, and at the same time the number of receive (Rx) antennas increases to NR, a theoretical channel transmission capacity of the MIMO communication system increases in proportion to the number of antennas, differently from a case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri).

$$R_i = \min(N_T, N_R) \qquad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 10(a), it is assumed that there are NT Tx antennas and NR Rx antennas.

In the case of a transmission signal, a maximum number of transmission information pieces is NT under the condition that NT Tx antennas are used, so that the transmission information can be represented by a specific vector shown in the following equation 2.

$$s = [s_1, s_2, \ldots, s_{N_T}]^T \qquad \text{[Equation 2]}$$

Individual transmission information pieces s1, s2, . . . , sNT may have different transmission powers. In this case, if the individual transmission powers are denoted by P1, P2, . . . , PNT, then transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In Equation 3, ŝ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector ŝ having an adjusted transmission power is applied to a weight matrix W, so that NT transmission signals x1, x2, . . . , xNT to be actually transmitted are configured. In this case, the weight matrix W is adapted to properly distribute transmission information to individual antennas according to transmission channel situations. The above-mentioned transmission signals x1, x2, . . . , xNT can be represented by the following equation 5 using the vector X.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$
$$= WPs$$

Here, Wij denotes a weight corresponding to i-th Tx antenna and j-th information. W represents a weight matrix or precoding matrix.

When NR Rx antennas are used, received signals y1, y2, . . . , yNR of individual antennas can be represented by a specific vector (y) shown in the following equation 6.

$$y = [y_1, y_2, \ldots, y_{N_R}]^T \quad \text{[Equation 6]}$$

When a channel modeling is executed in the MIMO communication system, individual channels can be distinguished from each other according to Tx/Rx antenna indexes. A specific channel passing the range from a Tx antenna j to a Rx antenna i is denoted by hij. In this case, it should be noted that the index order of the channel hij is located before a Rx antenna index and is located after a Tx antenna index.

FIG. 6(b) shows channels from NT Tx antennas to a Rx antenna i. Several channels are tied up, so that they are displayed in the form of a vector or matrix. Referring to FIG. 10(b), the channels passing the range from the NT Tx antennas to the Rx antenna i can be represented by the following equation 7.

$$h_i^T = [h_{i1}, h_{i2}, \ldots, h_{iN_T}] \quad \text{[Equation 7]}$$

If all channels passing the range from the NT Tx antennas to NR Rx antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix H shown in Equation 8. The AWGN n1, n2, . . . , nNR added to each of NR Rx antennas can be represented by a specific vector shown in the following equation 9.

$$n = [n_1, n_2, \ldots, n_{N_R}]^T \quad \text{[Equation 9]}$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

A matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \leq \min(N_T, N_R) \quad \text{[Equation 11]}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of information pieces that can be transmitted on a given channel.

Reference Signal (RS)

Since a packet is transmitted through a radio channel in a wireless communication system, a signal may be distorted during transmission. A receiver needs to correct the distorted signal using channel information in order to correctly receive the distorted signal. To detect channel information, a signal known to both the receiver and a transmitter is transmitted and channel information is detected using a degree of distortion of the signal when the signal is received through a certain channel. This signal is called a pilot signal or a reference signal.

When multiple antennas are used to transmit and receive data, a correct signal can be received only when channel state between each Tx antenna and each Rx antenna is detected. Accordingly, a reference signal is required for each Tx antenna.

A downlink reference signal defines a common reference signal (CRS) shared by all UEs in a cell and a dedicated reference signal (DRS) dedicated to a specific UE. Information for channel estimation and demodulation can be provided according to these reference signals.

A receiver (UE) can estimate channel state from the CRS and feed back an indicator related to channel quality, such as a channel quality indicator (CQI), a precoding matrix index (PMI) and/or a rank indicator (RI), to a transmitter (eNB). The CRS may be called a cell-specific reference signal. An RS related to feedback of channel state information (CSI) such as CQI/PMI/RI may be defined as a CSI-RS.

The DRS can be transmitted through a corresponding RE when data demodulation is needed. Presence or absence of the DRS may be signaled to the UE by a higher layer. In addition, the fact that the DRS is valid only when a corresponding PDSCH is mapped may be signaled to the UE. The DRS may be called a UE-specific reference signal or a demodulation reference signal (DMRS).

FIG. 7 illustrates a pattern of mapping a CRS and a DRS defined in 3GPP LTE (e.g. release-8) to a downlink resource block (RB) pair. A downlink RB pair as a reference signal mapping unit may be represented as one subframe in the time domain×12 subcarriers in the frequency domain. That is, an RB pair has a length of 14 OFDM symbols in the case of normal CP (FIG. 7(a)) and has a length of 12 OFDM symbols in the case of extended CP (FIG. 7(b)) in the time domain.

FIG. 7 shows RS positions in RB pairs in a system in which an eNB supports 4 transmit antennas. In FIG. 7, REs indicated by '0', '1', '2' and '3' respectively represent CRS positions with respect to antenna port indices 0, 1, 2 and 3. An RE indicated by 'D' represents a DRS position.

CRSs will be described in detail hereinafter.

The CRS is used to estimate a channel of a physical antenna and can be commonly received by all UEs in a cell. The CRS is distributed in the entire band. The CRS can be used for CSI acquisition and data demodulation.

The CRS is defined in various forms according to antenna configuration of a transmitter (eNB). 3GPP LTE (e.g. release-8) supports various antenna configurations and a downlink signal transmitter (eNB) may have three antenna configurations of a single antenna, 2 Tx antennas and 4 Tx antennas. When the eNB performs single antenna transmission, an RS for a single antenna port is provided. When the eNB performs 2-antenna transmission, RSs for 2 antenna ports are provided through time division multiplexing (TDM) and/or frequency division multiplexing (FDM). That is, the R0Ss for the 2 antenna ports can be discriminated from each other by being present in different time resources and/or different frequency resources. Furthermore, when the eNB performs 4-antenna transmission, RSs for 4 antenna ports are provided through TDM/FDM. Channel information estimated by a signal receiver (UE) using the CRS can be used to demodulate data transmitted through single antenna transmission, transmit diversity, closed-loop spatial multiplexing, open-loop spatial multiplexing, multi-user MIMO (MU-MIMO), etc.

In case of multi-antenna transmission, when an RS is transmitted through a specific antenna port, the RS is transmitted in an RE designated according to RS pattern and no signal is transmitted in REs designated for other antenna ports.

A rule of mapping the CRS to an RB conforms to Equation 12.

$$k = 6m + (v + v_{shift}) \bmod 6 \qquad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k is a subcarrier index, l is a symbol index, p is an antenna port index. In addition, $N_{symb}^{DL}$ denotes the number of OFDM symbols of a downlink slot, $N_{RB}^{DL}$ denotes the number of RBs allocated to downlink, $n_s$ is a slot index, $N_{ID}^{cell}$ is a cell ID and mod denotes modulo operation. An RS position in the frequency domain depends on Vshift. Since Vshift depends on cell ID, the RS position has different frequency shift values per cell.

Specifically, to improve channel estimation performance through the CRS, a CRS position in the frequency domain is shifted per cell such that cells have different frequency shift values. For example, when an RS is present for every 3 subcarriers, the RS can be present in a subcarrier 3k in a cell and in a subcarrier 3k+1 in another cell. For an antenna port, an RS is distributed at an interval of 6 REs (i.e. 6 subcarriers) in the frequency domain and spaced apart from REQ in which an RS for another antenna port is present in the frequency domain.

Power boosting may be applied to the CRS. Power boosting is a method for transmitting an RS with higher power using power corresponding to REs of an OFDM symbol, other than REs allocated for the RS.

An RS is disposed at a specific interval starting from symbol index (1) 0 of each slot in the time domain. The interval is defined based on CP length. RSs are present in symbols corresponding to symbol indices 0 and 4 in a slot in the case of normal CP and present in symbols corresponding to symbol indices 0 and 3 in the slot in the case of extended CP. Only RSs for up to 2 antenna ports are defined in a single OFDM symbol. Accordingly, in the case of 4-Tx antenna transmission, RSs for antenna ports 0 and 1 are present in symbols corresponding to symbol indices 0 and 4 (symbol indices 0 and 3 in the extended CP case) in a slot and RSs for antenna ports 2 and 3 are present in a symbol corresponding to symbol index 1 in the slot. However, the frequencies of the RSs for antenna ports 2 and 3 are switched in the second slot.

To provide higher spectral efficiency than 3GPP LTE (e.g. release-8), a system (e.g. LTE-A) having an extended antenna configuration may be designed. The extended antenna configuration may be an 8Tx antenna configuration. The system having the extended antenna configuration needs to support UEs operating in a conventional antenna configuration. That is, the system needs to support backward compatibility. Accordingly, it is necessary to support a reference signal pattern according to the conventional antenna configuration and to design a new reference signal pattern for an additional antenna configuration. Here, when a CRS for a new antenna port is added to a system having a conventional antenna configuration, RS overhead abruptly increases, decreasing throughput. In consideration of this, LTE-A evolved from 3GPP LTE introduces an additional RS (CSI-RS) for CSI measurement for a new antenna port.

A DRS will now be described in detail hereinafter.

The DRS (or UE-specific RS) is used for data demodulation. A precoding weight used for a specific UE is used for an RS in multi-antenna transmission such that the UE can estimate an equivalent channel obtained by combining the precoding weight transmitted through each Tx antenna and a transport channel when receiving the RS.

3GPP LTE (e.g. release-8) supports transmission through up to 4 Tx antennas and defines a DRS for rank-1 beamforming. The DRS for rank-1 beamforming is also used as an RS for antenna port index 5. A rule of mapping the DRS to an RB conforms to Equations 13 and 14. Equation 13 relates to the normal CP case and Equation 14 relates to the extended CP case.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k is a subcarrier index, l is a symbol index, p is an antenna port index. In addition, $N_{SC}^{RB}$ denotes an RB size in the frequency domain and is represented by the number of subcarriers, $n_{PRB}$ denotes a PRB number, $N_{RB}^{PDSCH}$ denotes the bandwidth of an RB in which a corresponding PDSCH is transmitted, $n_s$ is a slot index, $N_{ID}^{cell}$ is a cell ID and mod denotes modulo operation. An RS position in the frequency domain depends on Vshift. Since Vshift depends on cell ID, the RS position has different frequency shift values per cell.

LTE-A, the next generation of 3GPP LTE, considers MIMO, multi-cell transmission, enhanced MU-MIMO, etc. of a high order and also considers DRS based data demodulation in order to support efficient RS operation and an improved transmission scheme. That is, a DRS for two or more layers can be defined to support data transmission through an added antenna, separately from the DRS (antenna port index 5) for rank-1 beamforming, defined in 3GPP LTE (e.g. release-8).

Cooperative Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

Sounding Reference Signal (SRS)

An SRS is used for an eNB to measure channel quality and perform uplink frequency-selective scheduling based on the channel quality measurement. The SRS is not associated with data and/or control information transmission. However, the usages of the SRS are not limited thereto. The SRS may also be used for enhanced power control or for supporting various start-up functions of non-scheduled UEs. The start-up functions may include, for example, an initial modulation and coding scheme (MCS), initial power control for data transmission, timing advance, and frequency non-selective scheduling (in which a transmitter selectively allocates a frequency resource to the first slot of a subframe and then pseudo-randomly hops to another frequency resource in the second slot of the subframe).

The SRS may be used for measuring downlink channel quality on the assumption of the reciprocity of a radio channel between the downlink and the uplink. This assumption is valid especially in a time division duplex (TDD) system in which the downlink and the uplink share the same frequency band and are distinguished by time.

A subframe in which a UE within a cell is supposed to transmit an SRS is indicated by cell-specific broadcast signaling. A 4-bit cell-specific parameter 'srsSubframeConfiguration' indicates 15 possible configurations for subframes carrying SRSs in each radio frame. These configurations may provide flexibility with which SRS overhead can be adjusted according to network deployment scenarios. The other one configuration (a 16th configuration) represented by the parameter is perfect switch-off of SRS transmission in a cell, suitable for a cell serving high-speed UEs, for example.

Figure 8:
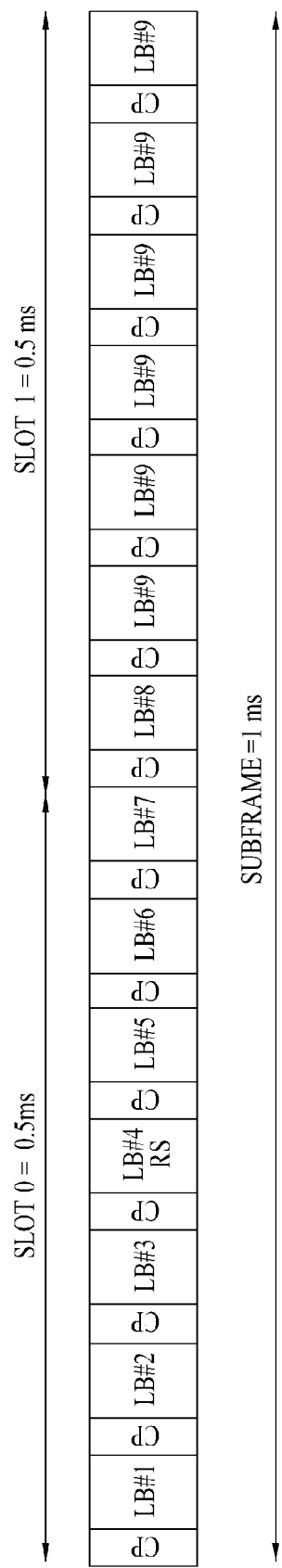
FIG. 8 illustrates an uplink subframe structure including SRS symbols.

As shown in FIG. 8, an SRS is always transmitted in the last SC-FDMA symbol of a configured subframe. Therefore, an SRS and a DMRS are positioned in different SC-FDMA symbols. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated for a given time unit and frequency band, using a base sequence (a random sequence or Zadoff-Chu (ZC)-based sequence set), and all UEs within a cell use the same base sequence. SRS transmissions in the same time unit and the same frequency band from a plurality of UEs within a cell are distinguished orthogonally by different cyclic shifts of the base sequence allocated to the plurality of UEs. Although the SRS sequences of different cells may be distinguished by allocating different base sequences to the cells, orthogonality is not ensured between the different base sequences.

Relay

A relay is considered in order to improve the coverage of high data rates, group mobility, temporary network deployment, cell edge throughput and/or to provide coverage in new areas.

The relay forwards transmission and reception between an eNB and a UE, and two links (backhaul link and access link) having different attributes are applied to each carrier frequency band. The eNB may include a donor cell. The relay wirelessly accesses a wireless access network through the donor cell.

A backhaul link between the eNB and the relay may be represented as a backhaul downlink when the backhaul link uses a downlink frequency band or a downlink subframe resource and represented as a backhaul uplink when the backhaul link uses an uplink frequency band or an uplink subframe resource. Here, a frequency band is a resource allocated in frequency division duplex (FDD) mode and a subframe is a resource allocated in time division duplex (TDD) mode. Similarly, an access link between the eNB and the relay may be represented as an access downlink when the access link uses a downlink frequency band or a downlink subframe resource and represented as access uplink when the access link uses an uplink frequency band or an uplink subframe resource.

The eNB needs to have uplink reception and downlink transmission functions and the UE needs to have uplink transmission and downlink reception functions. The relay needs to have functions of backhaul uplink transmission to the eNB, access uplink reception from the UE, backhaul downlink reception from the eNB and access downlink transmission to the UE.

Figure 9:
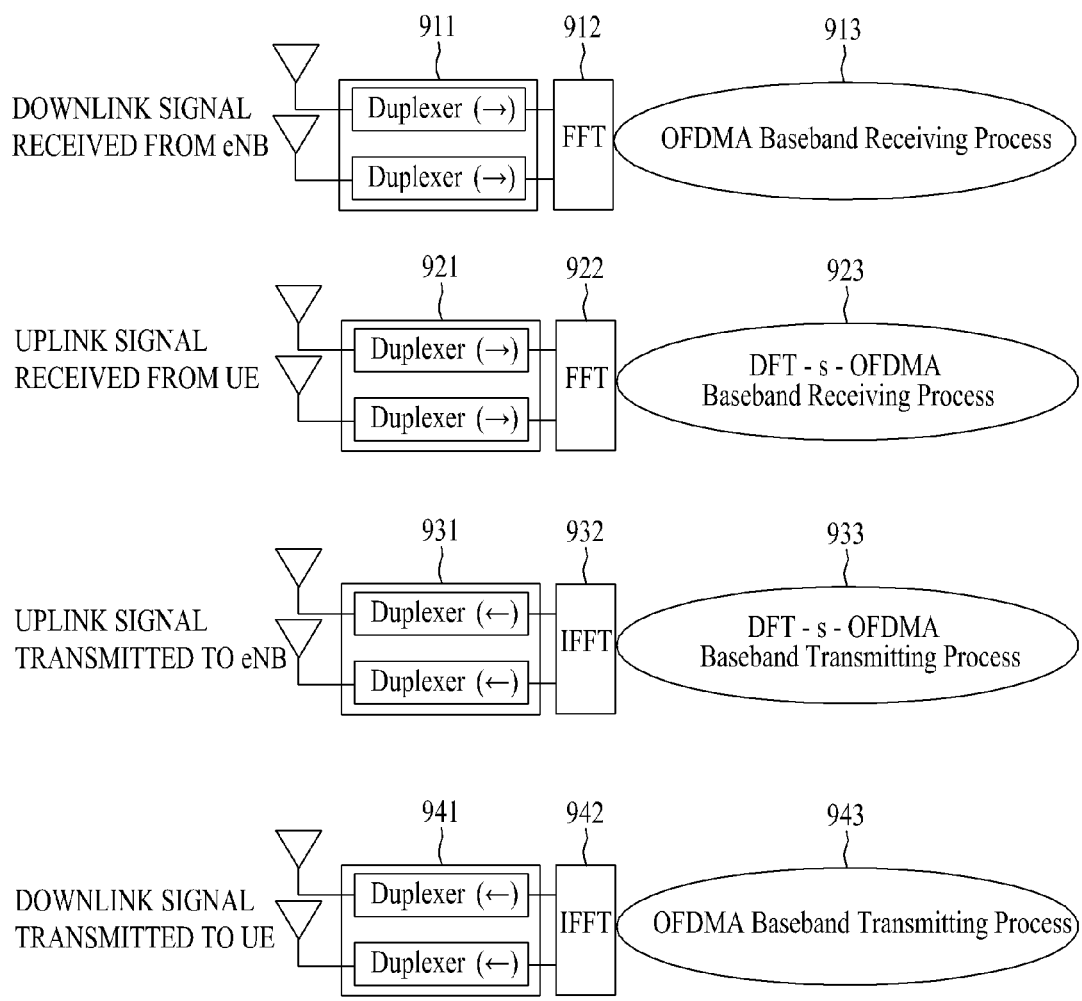
FIG. 9 illustrates examples of implementation of functions of a transmitter and a receiver of an FDD mode relay.

FIG. 9 illustrates examples of implementation of functions of a transmitter and a receiver of an FDD mode relay. A reception function of the relay is descried. A downlink signal received from an eNB is transmitted to a fast Fourier transform (FFT) module 912 via a duplexer 911 and an OFDMA baseband receiving process 913 is performed. An uplink signal received from a UE is delivered to an FFT module 922 via a duplexer 921 and a discrete Fourier transform-spread-OFDMA (DFT-s-OFDMA) baseband receiving process 923 is performed. The process of receiving the downlink signal from the eNB and the process of receiving the uplink signal from the UE may be performed in parallel. A transmission function of the relay is described. An uplink signal transmitted to the eNB is delivered through a DFT-s-OFDMA baseband transmission process 933, an inverse FFT (IFFT) module 932 and a duplexer 931. A downlink signal transmitted to the UE is delivered through an OFDM baseband transmission process 943, an IFFT module 942 and duplexer 941. The process of transmitting the uplink signal to the eNB and the process of transmitting the downlink signal to the UE may be performed in parallel. The duplexers arranged in one direction may be implemented as a single bidirectional duplexer. For example, the duplexer 911 and the duplexer 931 can be implemented as a single bidirectional duplexer and the duplexer 921 and the duplexer 941 can be implemented as a single bidirectional duplexer. A bidirectional duplexer may be implemented such that IFFT module and baseband process module lines related to transmission and reception in a specific carrier frequency band are branched from the bidirectional duplexer.

In relation to the use of a bandwidth (or spectrum) of a relay, the case where a backhaul link operates in the same frequency band as an access link is referred to as in-band, and the case where the backhaul link operates in different frequency bands from the access link is referred to as out-band. In both in-band and out-band, UEs operating according to LTE (e.g., Release-8) should be able to access a donor cell.

The relay may be classified into a transparent relay and a non-transparent relay depending upon whether or not the UE recognizes the relay. In the transparent relay, the UE is not aware that it is communicating with a network via the relay, and in the non-transparent relay, the UE is aware that it is communicating with the network via the relay.

In relation to control of the relay, the relay may be divided into a relay as part of a donor cell and a relay for controlling a cell of its own.

The relay as part of the donor cell may have a relay ID but does not have a cell ID of its own. If at least part of Radio Resource Management (RRM) is controlled by an eNB to which the donor cell belongs (while parts of the RRM may be located in the relay), this may be called a relay as part of the donor cell. Desirably, such a relay may support legacy UEs. Smart repeaters, decode-and-forward relays, different types of L2 (second layer) relays, and type-2 relays are examples of this type of relay.

In the case where a relay is in control of its own cells, the relay controls one or several cells and a unique physical-layer cell ID is provided to each of the cells controlled by the relay. The same RRM mechanism is available and, in terms of the UE, there is no difference in accessing cells controlled by a relay and cells controlled by a normal eNB. The cells controlled by the relay may support the legacy UEs. Self-backhauling relays, L3 (third layer) relays, type-1 relays, and type-1a relays are examples of this type of relay.

A type-1 relay is an in-band relay and controls a plurality of cells, each of which appears as a separate cell, distinct from the donor cell, to UEs. The plurality of cells has its own physical cell ID (defined in LTE Release-8) and the relay may transmit its own synchronization channels, reference signals, etc. In the context of single-cell operation, the UE may receive scheduling information and HARQ feedback directly from the relay and may transmit its own control channels (SR, CQI, ACK/NACK, etc.) to the relay. The type-1 relay appears as a legacy eNB (an eNB operating according to LTE Release-8) to legacy UEs (UEs operating according to LTE Release-8). Namely, the type-1 relay has backward compatibility. Meanwhile, to UEs operating according to an LTE-A system, the type-1 relay appears as an eNB different from the legacy eNB to allow for performance enhancement.

A type-1a relay has the same characteristics as the above-mentioned type-1 relay except that it operates in out-band. The operation of the type-1a relay may be configured to minimize the influence on the operation of an L1 (first layer) or to eliminate such influence.

A type-2 relay, which is an in-band relay, does not have a separate physical cell ID and thus does not create any new cells. The type-2 relay is transparent to the legacy UEs, and the legacy UEs are not aware of the presence of the type-2 relay. The type-2 relay may transmit a PDSCH but does not transmit a Common Reference Signal (CRS) and a PDCCH.

Meanwhile, in order to allow in-band operation of the relay, some resources in the time-frequency space should be reserved for the backhaul link and may be set not to be used for the access link. This is called resource partitioning.

A general principle for resource partitioning in the relay is as follows. The backhaul downlink and access downlink may be time division multiplexed in a single carrier frequency (namely, only one of the backhaul downlink and access downlink is activated at a specific time). Similarly, the backhaul uplink and access uplink may be time division multiplexed in a single carrier frequency (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes of the eNB and relay and uplink subframes of the eNB and relay, respectively.

In the case of an in-band relay, for example, if reception of the backhaul downlink from the eNB and transmission of the access downlink to the UE are simultaneously performed in a predetermined frequency band, a signal transmitted from a transmitting end of the relay may be received in a receiving end of the relay and thus signal interference or Radio Frequency (RF) jamming may occur at an RF front end of the relay. Similarly, if reception of the access uplink from the UE and transmission of the backhaul uplink to the eNB are simultaneously performed in a predetermined frequency band, signal interference may occur at the RF front end of the relay. Accordingly, in the relay, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installation thereof above/below ground)).

Figure 10:
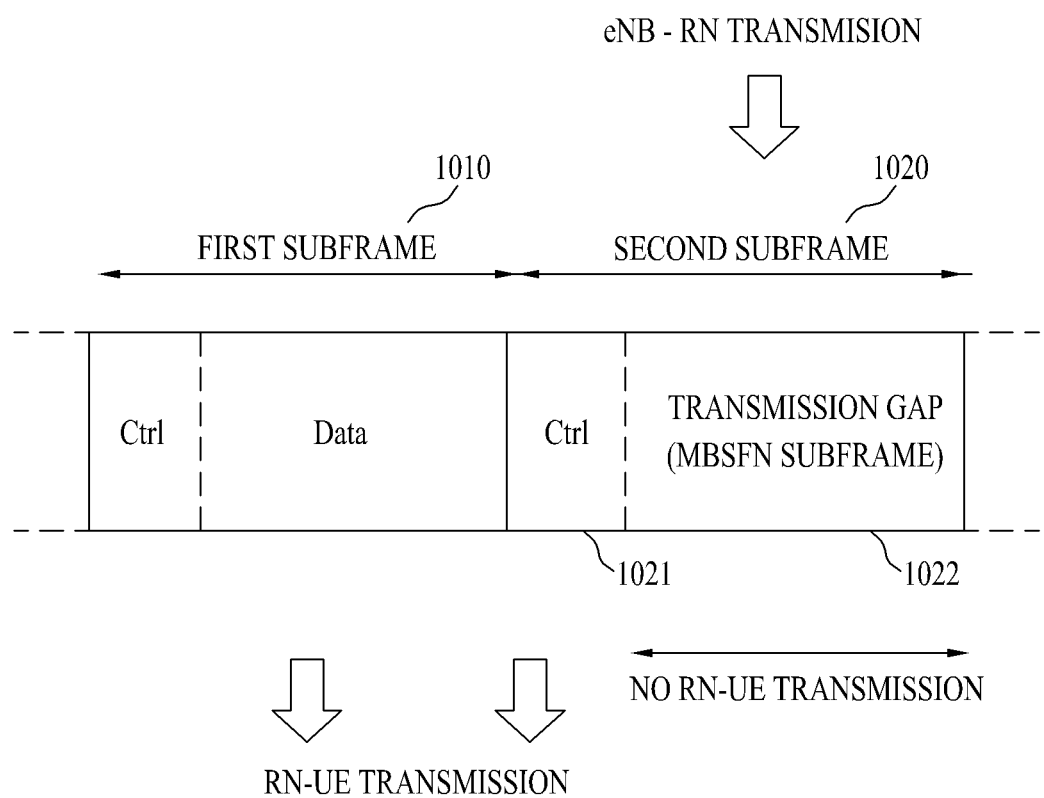
FIG. 10 illustrates transmission from a relay to a UE and downlink transmission from an eNB to a relay.

One method for solving the problem of signal interference is to allow the relay not to transmit a signal to UEs while receiving a signal from the donor cell. That is, a gap may be generated in transmission to the UEs from the relay and the UEs (including the legacy UEs) may be set not to expect any transmission from the relay during the gap. In FIG. 10, a first subframe 1010 is a normal subframe in which a downlink (i.e. access downlink) control signal and data are transmitted from the relay to the UE and a second subframe 1020 is a multicast broadcast single frequency network (MBSFN) subframe. A control signal is transmitted from the relay to the UE in a control region 1021 of the downlink subframe, whereas no signal is transmitted from the relay to the UE in the remaining region 1022 of the downlink subframe. Here, in the case of a legacy UE, since transmission of a physical downlink control channel (PDCCH) is expected in all downlink frames (in other words, the relay needs to support legacy UEs belonging to the coverage thereof such that the legacy UEs receive and measure PDCCHs in every subframe), it is necessary to transmit a PDCCH in all downlink subframes for correct operation of legacy UEs. Accordingly, even in a subframe (second subframe 1020) configured for downlink (i.e. backhaul downlink) transmission from the eNB to the relay, the relay needs to perform access downlink transmission instead of backhaul downlink reception in a period corresponding to first N (N=1, 2 or 3) OFDM symbols of the subframe. For this, since a PDCCH is transmitted from the relay to the UE in the control region 1021 of the second subframe, backward compatibility for legacy UEs served by the relay can be provided. The relay can receive a signal transmitted from the eNB in the remaining region 1022 of the second subframe since no signal is transmitted from the relay to the UE in the region 1022. Accordingly, through such a resource partitioning scheme, access downlink transmission and backhaul downlink reception can be prevented from being simultaneously performed in an in-band relay.

The second subframe 1022 using an MBSFN subframe will be described in detail hereinafter. The MBSFN subframe is a subframe for multimedia broadcast and multicast service (MBMS) for simultaneously transmitting the same signal in multiple cells. The control region 1021 of the second subframe may be regarded as a relay non-listening interval. The relay non-listening interval refers to a period in which a relay transmits an access downlink signal instead of receiving a backhaul downlink signal. The relay non-listening interval can be set to a length of 1, 2 or 3 OFDM symbols, as described above. The relay can perform access downlink transmission to the UE in the relay non-listening interval 1021 and receive a backhaul downlink signal from the eNB in the remaining region 1022. Here, since the relay cannot simultaneously perform transmission and reception in the same frequency band, time is taken for the relay to switch from transmission mode to reception mode. Accordingly, a guard time GT needs to be set to the first part of the backhaul downlink reception region 1022 such that the relay can perform transmission/reception mode switching in the region 1022. Similarly, even when the relay receives a backhaul downlink signal from the eNB and transmits an access downlink signal to the UE, a guard time (GT) for reception/transmission mode switching of the relay can be set. The duration of the GT may be set to a value in the time domain. For example, the duration of the GT can be set to k (k=1) time sample (Ts) or one or more OFDM symbols. A GT of the last part of the subframe may not be defined or set when relay backhaul downlink subframes are continuously configured or according to a predetermined subframe timing alignment relationship. This GT may be defined only in a frequency region set for backhaul downlink subframe transmission in order to maintain backward compatibility (legacy UEs cannot be supported when a GT is set in an access downlink period). The relay can receive a PDCCH and a PDSCH from the eNB in the backhaul downlink reception period 1022 other than the GT. Particularly, a PDCCH for the relay can be represented as a relay-PDCCH (R-PDCCH) in the sense of a relay dedicated physical channel.

Inter-Cell Interference Coordination (ICIC)

When coverages of two eNBs eNB1 and eNB2 overlap since the two eNBs are located adjacent to each other, a strong downlink signal from one eNB may cause interference for a UE served by the other eNB. For example, in FIG. 1, interference may be generated in the UE 130 served by the micro eNB 120 by a signal from the macro eNB 110. When inter-cell interference is generated, the two eNBs may reduce inter-cell interference through inter-cell cooperation.

It is assumed that signal transmission and reception are smoothly performed between two eNBs which interfere each other in the following embodiments of the present invention. For example, it is assumed that a wired/wireless link (e.g. backhaul link or Un interface) having satisfactory transmission conditions such as transmission bandwidth, time delay, etc. is present between the two eNBs and thus reliability of transmission and reception of a cooperative signal between the two eNBs is high. In addition, it is assumed that time synchronization between the two eNBs is within an allowable error range (when boundaries of downlink subframes of the two eNBs which interfere each other are aligned, for example) or the eNBs clearly recognize an offset between the subframe boundaries of the eNBs.

Referring back to FIG. 1, eNB1 110 may be a macro eNB that covers a wide area with high Tx power and eNB2 120 may be a micro eNB that covers a narrow area with low Tx power. As shown in FIG. 1, when eNB2 120 is located at a cell edge and strong interference from eNB1 110 is applied to the UE 130 served by eNB2 120, effective communication may not be performed without appropriate inter-cell cooperation.

Particularly, when a large number of UEs are connected to micro eNB2 120 having low power to distribute loads on which macro eNB1 110 provides services, the possibility that the aforementioned inter-cell interference occurs is high.

For example, when a UE selects a serving eNB, the UE can calculate and compare Rx powers of downlink signals from a micro eNB and a macro eNB by adding a predetermined adjustment value (bias value) to the Rx power of the micro eNB and adding no adjustment value to the Rx power of the macro eNB. Consequently, the UE can select an eNB that provides highest downlink Rx power as the serving eNB. Accordingly, a larger number of UEs can be connected to the micro eNB.

The micro eNB can be selected as the serving eNB even though the intensity of the downlink signal received by the UE from the macro eNB is much higher than the downlink signal from the micro eNB, and strong interference from the macro eNB may be applied to UEs connected to the micro eNB. In this case, UEs located at the boundary of the micro eNB may not perform correct operations due to strong interference from the macro eNB if inter-cell cooperation is not provided.

The aforementioned inter-cell interference generation situation is exemplary and embodiments of the present invention are equally applicable to different inter-cell interference generation situations (e.g. a case in which inter-cell interference occurs between a CSG type HeNB and an OSG type macro eNB, a case in which a micro eNB causes interference and a macro eNB is interfered by the micro eNB or a case in which inter-cell interference occurs between micro eNBs or between macro eNBs).

The following description is based on the assumption that an interfering cell is eNB1, an interfered cell is eNB2, eNB1 is a macro eNB and eNB2 is a micro eNB. However, the present invention is not limited thereto and the principle of the present invention is applicable to various inter-cell interference cases.

To perform effective operations even when inter-cell interference is present between two eNBs, appropriate cooperation between the two eNBs needs to be achieved and a signal that enables cooperation can be transmitted/received through a link (e.g. X2 interface) between the two eNBs. For example, when inter-cell interference is generated between a macro eNB and a micro eNB, the macro eNB may control inter-cell cooperation and the micro eNB may perform an appropriate operation according to a cooperative signal signaled by the macro eNB. In addition, an eNB may provide signaling (e.g. OTA (over the air) signaling) related to inter-cell interference coordination to a UE affected by inter-cell interference independently or simultaneously with inter-cell interference coordination operation.

Inter-cell interference coordination may be performed in frequency resources and/or time resources. In one embodiment of an inter-cell interference coordination scheme, eNB 1 may not perform transmission (i.e. transmit a null signal or perform silencing) in a specific resource region or reduce Tx power for a UE connected to eNB2. Here, the specific resource region in which silencing is performed may be represented as a time resource and/or a frequency resource.

For example, the position of a silenced time resource may be determined by a combination of at least one of the entire time region, a specific subframe, a specific slot and a specific OFDM symbol. In addition, the position of a silenced frequency resource may be determined by a combination of at least one of the entire frequency band, a specific carrier (in case of carrier aggregation using a plurality of carriers), a specific resource block and a specific subcarrier. Accordingly, a resource region in which silencing is performed can be correctly specified.

Cell range extension (CRE) of the micro cell can be achieved according to silencing or Tx power reduction of the macro cell. For example, the macro cell can de-boost Tx power by a maximum of 9 dB in a specific resource region or transmit no signal to reduce interference applied to the micro cell in the specific resource region and extend the range that can be served by the micro cell.

A description will be given of a detailed inter-cell interference coordination scheme.

Inter-Cell Interference Coordination in Time Domain

Inter-cell interference coordination with respect to a time resource will now be described. For example, inter-cell interference coordination with respect to a time resource in a 3GPP LTE (release-10) wireless communication system can be performed in such a manner that the time resource is segmented into a plurality of subframes and information representing whether silencing or transmission with reduced Tx power is performed for each subframe is indicated. That is, inter-cell interference coordination with respect to the time resource refers to cooperation between the interfering cell (eNB1) and the interfered cell (eNB2) with respect to how the subframes will be used. Here, information on silencing or Tx power information for each subframe may be exchanged between the interfering cell and the interfered cell through X2 signaling, backhaul signaling or OAM (operations administration and maintenance). A subframe to which silencing is applied may be referred to as an almost blank subframe (ABS).

For example, eNB1 can set a specific subframe (or subframe set) to an ABS such that strong interference from eNB1 is not applied to eNB2 in the specific subframe. That is, downlink Tx power, traffic or activity of eNB1 is reduced or no signal is transmitted (i.e. a null signal is transmitted) in the specific subframe (or subframe set).

Specifically, an ABS may refer to a subframe in which only a CRS is transmitted in a control region and a data region and other control information and data are not transmitted. However, important downlink channels and downlink signals, such as PBCH (physical broadcast channel), PSS (primary synchronization signal), SSS (secondary synchronization signal), etc., may be transmitted in the ABS. In addition, a CRS of the data region may not be transmitted in the ABS.

When eNB1 sets the ABS, information related to the ABS may be exchanged through a link (e.g. X2 interface) between eNB1 and eNB2. For example, an ABS information element (IE) and/or an ABS status IE defined in 3GPP LTE standard document (e.g. TS 36.423) can be used.

TABLE 1

| IE/Group Name | Presence | Range | IE type and reference | Semantics description |
|---|---|---|---|---|
| CHOICE ABS Information | M | — | — | |
| >FDD | | | — | — |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . . ) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1-5; 60 for UL/DL subframe configuration 6; 70 for UL/DL subframe configuration 0. UL/DL subframe configuration defined in TS 36.211 [10]. |

TABLE 1-continued

| IE/Group Name | Presence | Range | IE type and reference | Semantics description |
|---|---|---|---|---|
| | | | | The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

Table 1 shows an ABS IE transmitted from eNB1 that sets the ABS to eNB2. The ABS IE may include ABS pattern information in TDD and FDD, information on the number of cell-specific antenna ports for CRS, measurement subset information, etc.

Specifically, the ABS pattern information indicates a subframe to be used as an ABS and is composed of a 40-bit bitmap in case of FDD and composed of a maximum of a 70-bit bitmap according to downlink/uplink subframe configuration in case of TDD.

For example, in case of FDD, 40 bits indicate 40 subframes, a bit value "1" indicates an ABS and a bit value "0" indicates a non-ABS.

The information on the number of cell-specific antenna ports is used for CRS measurement such that a served UE can perform restricted measurement only in the ABS.

The measurement subset information is a subset of the ABS pattern information and is composed of a 40-bit bitmap in case of FDD and composed of a maximum of 70-bit bitmap in case of TDD. A measurement subset refers to a restricted measurement set recommended by eNB1 to set restricted measurement in the UE served by eNB2. A subframe set to the measurement subset may be regarded as a subframe that is more statically set to an ABS from among subframes set to ABSs.

TABLE 2

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB$_2$ for UEs needing protection by ABS from inter-cell interference for DL scheduling, or allocated by the eNB$_2$ for other reasons (e.g, some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position In the bitmap represents a subframe, for which value "1" Indicates 'ABS that has been designated as protected from inter-cell interference by the eNB$_1$, and available to serve this purpose for DL scheduling In the eNB$_2$' and value "0" is used for all other subframes. |

TABLE 2-continued

| IE/Group Name | Presence | Range | IE type and reference | Semantics description |
|---|---|---|---|---|
| >TDD<br>>>Usable ABS Pattern Info | M | — | BIT STRING (1 ... 70) | The pattern represented by the bitmap is a subset of, or the same as, the corresponding ABS Pattern Info IE conveyed in the LOAD INFORMATION message from the eNB$_1$.<br>Each position in the bitmap represents a subframe, for which value "1" indicates 'ABS that has been designated as protected from inter-cell Interference by the eNB$_1$, and available to serve this purpose for DL scheduling in the eNB$_2$' and value "0" is used for all other subframes.<br>The pattern represented by the bitmap is a subset of, or the same as, the corresponding ABS Pattern Info IE conveyed in the LOAD INFORMATION message from the eNB$_1$. |

Table 2 shows the ABS status IE. The ABS status IE may be transmitted from eNB2 to eNB1 and signals whether eNB1 needs to correct the ABS pattern. The ABS status IE may include usable ABS pattern information and downlink (DL) ABS status information.

The usable ABS pattern information is bitmap information indicating whether a subframe set to an ABS has been correctly used for interference mitigation and corresponds to a subset of the ABS pattern IE included in a load information message and transmitted from the interfering cell (eNB1). Specifically, each position in the bitmap represents a subframe, bitmap information corresponding to a subframe set to "1" indicates an ABS that has been designated as protected from inter-cell interference by eNB1, and eNB2 mitigates inter-cell interference by performing downlink scheduling in the subframe set to "1".

The DL ABS status information indicates the percentage of used ABS resources. Specifically, the DL ABS status information refers to the percentage of resource blocks allocated by the interfered cell (eNB2) for UEs that need protection from inter-cell interference from among the total number of downlink resource blocks in the ABS indicated by the usable ABS pattern information. That is, the DL ABS status information represents whether eNB2 efficiently uses the ABS for the purpose of interference elimination.

Inter-Cell Interference Coordination in Frequency Domain

A description will be given of inter-cell interference coordination with respect to frequency resources. For example, inter-cell interference coordination with respect to a frequency resource in a 3GPP LTE (release-8) wireless communication system can be performed by dividing the frequency resource into specific resource (e.g. physical resource block (PRB) or subband) units and transmitting/receiving information on the specific resource units through the link between the two eNBs. Specifically, information on the specific resource units may include relative narrowband transmission power (RNTP), interference overload indication (IOI), high interference indication (HII), etc.

Here, the RNTP refers to information representing downlink Tx power that the interfering cell (eNB1) uses in a specific resource (e.g. PRB or subband). The RNTP may be determined using a bitmap in the specific resource unit and determined bitmap information may be transmitted to an interfered cell (eNB2) through the link between the eNBs. For example, RNTP set to "0" in the specific resource unit represents that downlink Tx power does not exceed a defined threshold value and RNTP set to "1" represents that it is impossible to ensure whether the downlink Tx power does not exceed the defined threshold value.

The IOI refers to information indicating the quantity of uplink interference in the specific resource unit, which is caused by the interfering cell (eNB1). That is, the IOI is information indicating a specific resource which is severely interfered. For example, when the IOI represents severe interference in a specific resource, the IOI indicates presence of severe uplink interference in the specific resource. In this case, the interfered cell (eNB2) can mitigate interference present between eNB1 and eNB2 by scheduling a UE using low uplink Tx power from among UEs served thereby in the specific resource.

The HII indicates the sensitivity of uplink interference from the interfering cell (eNB1) with respect to a specific resource. For example, when the HII is set to '1' in the specific resource, the HII represents that there is a possibility that eNB1 schedules a UE having high uplink Tx power (i.e. causing storing inter-cell interference) in the specific resource. When the HII is set to '0' in the specific resource, the HII represents that there is a possibility that eNB1 schedules a UE having low uplink Tx power in the specific resource. In this case, the interfered cell (eNB2) may use a specific resource to which interference is less applied for which the HII is set to '0', to schedule UEs served thereby and schedule UEs that can operate even in case of serous interference in a specific resource to which strong interference is applied, for which the HII is set to '1', thereby mitigating inter-cell interference.

Restricted Measurement

For a measurement resource set by an eNB, a UE can measure the intensity of a signal from the eNB and the intensity of an interference signal from another eNB and feed back the measurement result to the eNB. The eNB can use the measurement result for scheduling of the UE.

If eNB1 reduces Tx power in a specific resource region, a variation in an interference signal per resource region, which is received by a UE belonging to eNB2 increases. That is, the intensity of the interference signal is low in the specific resource region and is high in other resource regions. In this case, when the UE calculates the simple average of interference signal intensity in the measurement resource without taking into account the specific resource region and feeds back the simple average, it is difficult for eNB2 to correctly use a subframe in which eNB1 reduces Tx power. Accordingly, when eNB1 sets an ABS, interference applied to eNB2 depends on the ABS pattern and thus eNB2 sets resources having similar interference characteristics as measurement resources in consideration of the ABS pattern of eNB1 to enable measurement of the UE. Setting of measurement in a restricted resource for the UE may be referred to as restricted measurement.

For example, to set a measurement resource for CSI, an eNB can signal a plurality of subframe sets for channel measurement to a UE through higher layer signaling. If two subframe sets are configured for CSI measurement, the first subframe set may be called C0 and the second subframe set may be called C1. Subframes belonging to one subframe set preferably have similar interference characteristics. For example, C0 can be selected from subframes set by a neighboring cell to ABSs and C1 can be selected from other subframes. C0 and C1 do not overlap and a subframe which does not belong to C0 and C1 may be present. The UE for which the plurality of subframe sets for channel measurement has been set can perform channel measurement and reporting per subframe set. For example, the UE can determine CSI with respect to C0 on the basis of channel and interference signal averages in subframes belonging to C0 and determine CSI with respect to C1 on the basis of channel and interference signal averages in subframes belonging to C1.

To set measurement resources for RLM (radio link monitoring) or RRM (radio resource management), the eNB can signal a specific subframe set. RRM measurement may include measurement of reference signal received power (RSRP), reference signal received quality (RSRQ), received signal strength indicator (RSSI), etc. RLM measurement may include measurement for detection of radio link failure (RLF) such as no reception of a downlink control signal or remarkable decrease in received signal quality. Measurement resources for RLM/RRM may be set separately from the measurement resource for CSI. For example, a subframe set for RLM/RRM measurement in a UE belonging to eNB2 can be selected from subframes set to ABSs.

Improved ICIC

The ABS can be classified into a zero power-ABS (z-ABS) through which data (or PDSCH signal) in a data region of a downlink subframe is not transmitted and a reduced power-ABS (r-ABS) through which data (or PDSCH signal) in a data region of a downlink subframe is transmitted with very low Tx power.

When the r-ABS is used, a UE served by eNB1 can receive data even in an ABS to improve system throughput. That is, eNB1 may perform downlink transmission while interference applied to eNB2 is reduced by decreasing Tx power of eNB1. To achieve this, an r-ABS pattern (i.e. information indicating a subframe set to the r-ABS) and information on power applied to the r-ABS need to be exchanged between cells that cause mutual interference. In addition, it is necessary to inform an interfered UE of the r-ABS pattern and Tx power information. The present invention defines information related to r-ABS configuration and provides a method of exchanging the information between cells and a method of signaling the information to a UE.

Setting of r-ABS Tx Power

Figure 11:
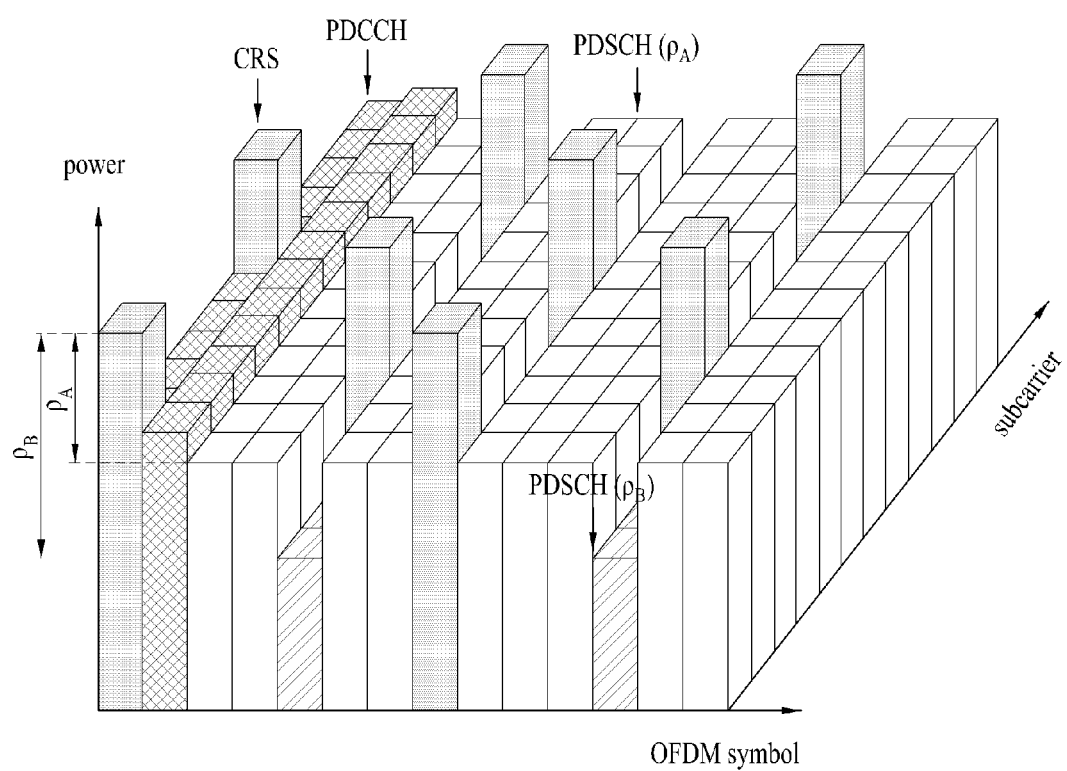
FIG. 11 illustrates an example of power allocation to resource elements included in a downlink subframe.

Wireless communication systems such as 3GPP LTE define EPRE (energy per resource element) that indicates an energy value per resource element for downlink resource Tx power allocation. FIG. 11 illustrates exemplary power allocation to resource elements included in a downlink subframe.

In FIG. 11, X axis represents OFDM symbol, Y axis represents subcarrier and Z axis represents Tx power.

An eNB determines Tx power allocated to downlink resources as an energy value per resource element. Downlink resource Tx power allocation is based on EPRE with respect to a cell-specific reference signal (CRS), and EPRE for a resource region of a physical downlink shared channel (PDSCH) on which data is transmitted is represented as a percentage of EPRE of the CRS.

For example, the ratio of EPRE of the PDSCH to EPRE of the CRS in an OFDM symbol period in which the CRS is not present in the time domain in a downlink subframe is defined as $\rho_A$ and as $\rho_B$ in an OFDM symbol period in which the CRS is present.

Here, $\rho_A$ may be determined by a power offset $\delta_{power-offset}$ and a UE-specific parameter PA according to whether multiuser-MIMO (MU-MIMO) transmission scheme is applied. $\delta_{power-offset}$ may be set to 0 dB for all PDSCH transmission schemes other than MU-MIMO and the UE-specific parameter PA may be signaled to a UE through a higher layer. In addition, $\rho_B/\rho_A$ may be determined by the number of antenna ports, which is cell-specifically set, and a cell-specific parameter PB signaled by a higher layer and given as shown in Table 3.

TABLE 3

| $P_B$ | $\rho_B/\rho_A$ | |
|---|---|---|
| | One Antenna Port | Two and Four Antenna Ports |
| 0 | 1 | 5/4 |
| 1 | 4/5 | 1 |
| 2 | 3/5 | 3/4 |
| 3 | 2/5 | 1/2 |

A power control dynamic range with respect to each RE in a wireless communication system such as LTE may be restricted as shown in Table 4 according to requirements (e.g. error vector magnitude (CVM), out-of-band emission, etc.) with respect to radio frequency.

TABLE 4

| Modulation scheme used on the RE | RE power control dynamic range (dB) | |
|---|---|---|
| | (down) | (up) |
| QPSK (PDSCH) | −6 | +4 |
| QPSK (PDSCH) | −6 | +3 |
| 16QAM (PDSCH) | −3 | +3 |
| 64QAM (PDSCH) | 0 | 0 |

Table 4 shows an RE power control dynamic range according to a modulation scheme of an E-UTRA eNB. The Re power control dynamic range refers to a difference between Tx power of each RE and average Tx power of REs when transmission is performed with maximum Tx power of the eNB under specified reference conditions. The RE power control dynamic range may be restricted by requirements such as out-of-band emission, EVM, etc. Out-of-band emission is unwanted emission and refers to immediate emission to the outside of a channel bandwidth as a result of a modulation process and non-linearity of a transmitter. EVM refers to a difference between an ideal symbol and a measured symbol after quantization. EVM is defined as a square root of the ratio of mean reference power to mean error vector power and may be represented as a percentage.

The RE power control dynamic range shown in Table 4 can be determined as the upper limit and the lower limit of Tx power with respect to each RE on the basis of Tx power of REs when the eNB performs transmission with maximum Tx power under specified reference conditions. Specifically, the upper limit (up) of Tx power with respect to each RE can be determined by the aforementioned out-of-band emission according to a modulation process and transmitter non-linearity and the lower limit (down) thereof can be determined by the aforementioned EVM.

As described above, power allocation to a downlink subframe may be determined by $\rho_A$ and $\rho_B$ and configuration information about power allocation may be provided from the eNB to the UE through higher layer signaling.

When the lower limit of the RE power control dynamic range is defined as shown in Table 4, RE Tx power cannot be set to lower than the lower limit. For example, supporting of the r-ABS through which downlink transmission is performed with very low power, as described above, may be restricted. In other words, the aforementioned power allocation scheme for normal downlink subframes may not be valid for the r-ABS.

Figure 12:
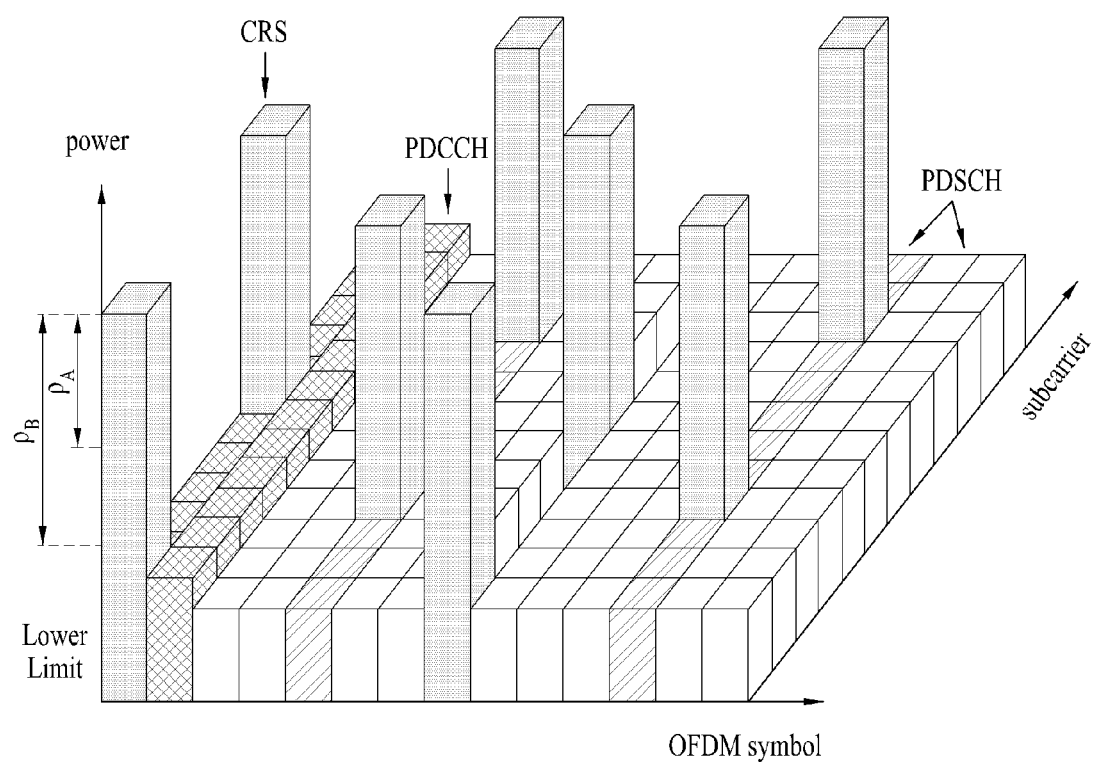
FIG. 12 illustrates another example of power allocation to resource elements included in a downlink subframe.

FIG. 12 illustrates another example of allocating power per RE included in a downlink subframe. In FIG. 12, X axis represent OFDM symbol, Y axis represents subcarrier and Z axis represents Tx power.

FIG. 12 shows exemplary Tx power for each RE in an r-ABS. In the case of the r-ABS, the ratio of EPRE of PDSCH to EPRE of CRS may differ from $\rho_B/\rho_A \neq 1$ which is determined based on higher layer signaling. In this case, downlink channel measurement and/or downlink data demodulation of the UE may not be correctly performed due to a difference between actual Tx power and Tx power determined by the UE through signaling from the eNB.

Specifically, in 3GPP LTE, allocation of Tx power of normal downlink subframes is determined on the basis of $\rho_A$ (i.e. the ratio of EPRE of PDSCH to EPRE of CRS in an OFDM symbol period in which no CRS is present) and $\rho_B$ (i.e. the ratio of EPRE of PDSCH to EPRE of CRS in an OFDM symbol period in which a CRS is present) and $\rho_A$ and $\rho_B$ are respectively determined by the UE-specific parameter PA and cell-specific parameter PB. However, the r-ABS Tx power allocation scheme in which Tx power lower than Tx power for a PDSCH resource region of a normal downlink subframe is allocated to a PDSCH resource region of the r-ABS differs from the normal downlink subframe Tx power allocation scheme. That is, Tx power allocation information about the r-ABS cannot be supported by the conventionally defined Tx power information. Accordingly, it is necessary to define downlink Tx power allocation information for supporting the r-ABS with r-ABS pattern information and to define a method for signaling the information to eNBs and/or UEs.

In addition, when an interfering eNB (eNB1) configures an r-ABS from among downlink subframes, interference caused by eNB1 varies according to the pattern and Tx power of a specific subframe. Accordingly, an interfered eNB (eNB2) may determine a subframe (i.e. measurement resources) for which a UE served by eNB2 will perform restricted measurement and signal the subframe to the UE using information indicating a subframe set to an r-ABS from among downlink subframes of the interfering eNB (eNB1) and Tx power information of the r-ABS.

Embodiment 1

The present embodiment relates to a method of exchanging information between cells for improved ICIC. Specifically, the present embodiment relates to a method for transmitting, to the interfered cell (eNB2), information (referred to as "r-ABS pattern information" hereinafter) which indicates a resource region set to an r-ABS configured by the interfering cell (eNB1) and/or information (referred to as "r-ABS power indication information" hereinafter) which indicates a Tx power level for the r-ABS.

The r-ABS pattern information may be provided to eNB2 from eNB1 through a link (e.g. X2 interface) between eNB1 and eNB2. The r-ABS pattern information may be defined using a bitmap. For example, 40 subframes can be matched to a 40-bit bitmap to represent that a subframe indicated by a specific value in the bitmap is an r-ABS. In addition, eNB1 may discriminate a z-ABS in which data is not transmitted in a data region from the r-ABS to which a Tx power allocation scheme different from that for the z-ABS is applied and transmit pattern information (i.e. bitmap information) about each of the z-ABS and r-ABS to eNB2. Furthermore, eNB1 may indicate the r-ABS using RNTP. For example, eNB1 may define new RNTP having a lower threshold than the conventional RNTP and indicate a subframe to which the new RNTP is applied as the r-ABS. In addition, a time region (i.e. subframes) in which an r-ABS is present may be determined by the r-ABS bitmap and a frequency region in which the r-ABS is present may be determined by the new RNTP, and thus the position of the r-ABS in the time-frequency region may be indicated. An r-ABS pattern may be defined for only one of the time region and the frequency region.

In the case of the z-ABS in which data is not transmitted, only the ABS pattern described with reference to Table 1 may be indicated. In the case of the r-ABS in which data is transmitted, however, it is necessary to signal information on a power level in the r-ABS as well as the r-ABS pattern to a neighboring cell. For example, "r-ABS pattern information" and "r-ABS power indication information" need to be provided to eNB2 from eNB1.

The r-ABS power indication information may be signaled as a reduced Tx power level or estimated Tx power level compared to a normal Tx power level. For example, information on Tx power in the r-ABS may be signaled as the average of differences between the normal Tx power level and Tx power levels with respect to a plurality of r-ABSs. In addition, while an r-ABS power level may be commonly applied to a plurality of subframes set to r-ABSs, the r-ABS power level can be set per subframe (i.e. subframe-specifically). Furthermore, r-ABS Tx power may be set and signaled per OFDM symbol in one subframe.

A description will be given of a method for signaling the r-ABS power indication information according to embodiments of the present invention.

Embodiment 1-1

The present embodiment relates to a method of defining and using $P_A'$ as the r-ABS Tx power indication information.

As described above, the ratio of PDSCH EPRE to CRS EPRE in an OFDM symbol period in which a CRS is not present in a normal subframe is defined as $\rho_A$ and the ratio of PDSCH EPRE to CRS EPRE in an OFDM symbol period in which a CRS is present in the normal subframe is defined as $\rho_B$. Here, $\rho_A$ and $\rho_B$ are respectively determined by a UE-specific parameter $P_A$ and a cell-specific parameter $P_B$.

Figure 13:
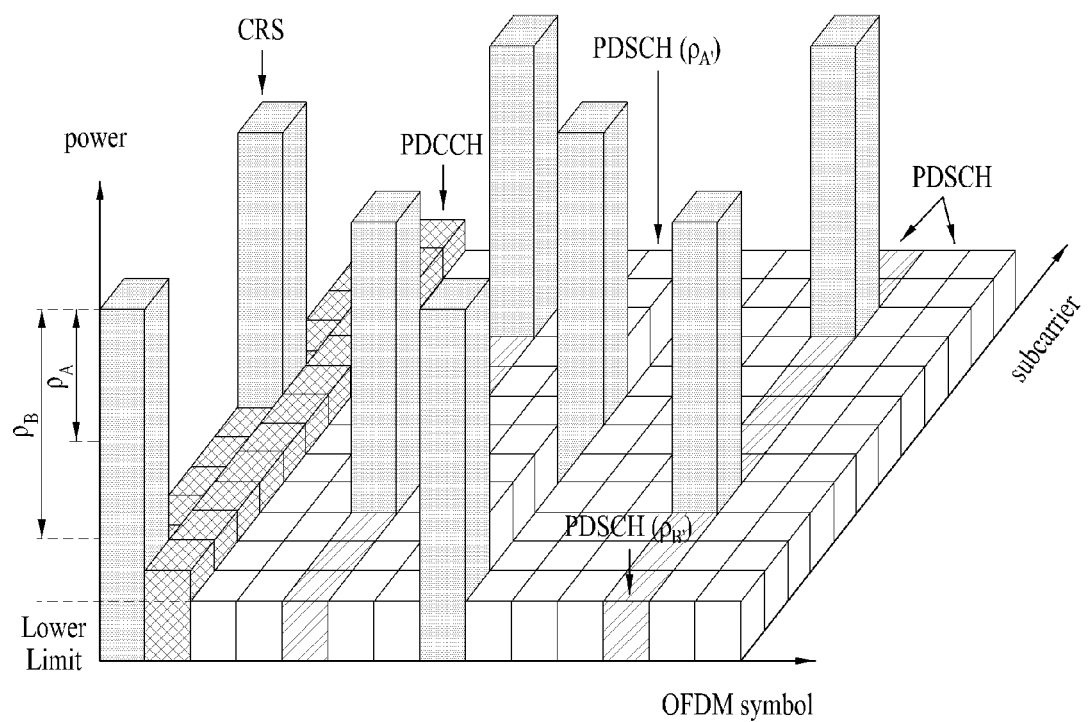
FIG. 13 another example of power allocation to resource elements included in a downlink subframe.

In the present embodiment, the UE-specific parameter from among parameters used to calculate downlink Tx power is newly defined as a UE-specific parameter $P_A{'}$ for the r-ABS. ABS. That is, $P_A{'}$ may be set such that PDSCH EPRE determined by $\rho'_A$ in the r-ABS corresponds to low Tx power as shown in FIG. 13. In addition, the cell-specific parameter $P_B$ with respect to the normal subframe may be reused as a cell-specific parameter $P_B{'}$ used to calculate the ratio of PDSCH EPRE to CRS EPRE, $\rho'_B$, in an OFDM symbol period in which a CRS is present in the r-ABS. For example, eNB1 may transmit the newly defined parameter $P_A{'}$ and the existing parameter $P_B$ to eNB2 through the link (e.g. X2 interface) between eNB1 and eNB2. Accordingly, eNB2 can determine $\rho'_A$ and $\rho'_B$ for the r-ABS.

FIG. 13 illustrates exemplary r-ABS Tx power allocation on the basis of the r-ABS Tx power indication information. According to embodiment 1-1, the UE-specific parameter $P_A{'}$ with respect to the r-ABS can determine $\rho'_A$ that makes PDSCH EPRE in an OFDM symbol period in which a CRS is not present correspond to low Tx power as shown in FIG. 13. While FIG. 13 shows that the cell-specific parameter $P_B$ is 1, $\rho'_A$ and $\rho'_B$ are equal to each other, and PDSCH Tx power in the OFDM symbol period in which a CRS is present corresponds to PDSCH Tx power in the OFDM symbol period in which a CRS is not present, the present invention is not limited thereto. That is, when the cell-specific parameter $P_B$ is a value other than 1, PDSCH Tx power allocation in the OFDM symbol period in which a CRS is present may differ from PDSCH Tx power allocation in the OFDM symbol period in which a CRS is not present.

In addition, eNB1 may transmit information on system constraints according to use of the r-ABS to eNB2 through the link (e.g. X2 interface) between eN1 and eNB2. Here, the system constraints refer to requirements for Tx power of eNBs and may be appropriately determined based on network configuration for implementing the present invention. Accordingly, eNB2 can be aware of a final Tx power allocation value with respect to the r-ABS of eNB1 using a result obtained on the basis of $P_A{'}$ and the system constraints.

Embodiment 1-2

The present embodiment relates to a method of defining and using $\delta_{power-offset}$ as the r-ABS Tx power indication information.

As described above, Tx power allocation to downlink subframes is dependent on $\rho_A$ which is determined on the basis of Tx power offset information $\delta_{power-offset}$ in addition to the UE-specific parameter $P_A$ in 3GPP LTE.

In the present embodiment, the r-ABS Tx power offset information $\delta_{power-offset}{'}$ is newly defined. That is, $\rho'_A$ may be determined on the basis of the existing parameter $P_A$ and the newly defined parameter $\delta_{power-offset}{'}$ and $\rho'_B$ may be determined on the basis of the existing parameter $P_B$. For example, eNB1 may transmit $\delta_{power-offset}{'}$, $P_A$ and $P_B$ to eNB2 through the link (e.g. X2 interface) between eNB1 and eNB2. Accordingly, eNB2 can determine $\rho'_A$ and $\rho'_B$ with respect to the r-ABS.

According to embodiment 1-2, PDSCH EPRE in an OFDM symbol period in which a CRS is not present in the r-ABS may be determined on the basis of $\rho_A$ and $\delta_{power-offset}{'}$ as shown in FIG. 13. That is, even when $\rho_A$ is given as the same value as the UE-specific parameter for the normal subframe, PDSCH EPRE can be determined as low Tx power as shown in FIG. 13 by $\delta_{power-offset}{'}$ for the r-ABS. While FIG. 13 shows that the cell-specific parameter $P_B$ is 1, $\rho'_A$ and $\rho'_B$ are equal to each other, and PDSCH Tx power in the OFDM symbol period in which a CRS is present corresponds to PDSCH Tx power in the OFDM symbol period in which a CRS is not present, the present invention is not limited thereto. That is, when the cell-specific parameter $P_B$ is a value other than 1, PDSCH Tx power allocation in the OFDM symbol period in which a CRS is present may differ from PDSCH Tx power allocation in the OFDM symbol period in which a CRS is not present.

In addition, eNB1 may transmit information on system constraints according to use of the r-ABS to eNB2 through the link (e.g. X2 interface) between eN1 and eNB2. Accordingly, eNB2 can be aware of a final Tx power allocation value with respect to the r-ABS of eNB1 using a result obtained on the basis of $\delta_{power-offset}{'}$ and the system constraints.

Embodiment 1-3

The present embodiment relates to a method of defining and using $P_A{'}$ and $P_B{'}$ as the r-ABS Tx power indication information.

$P_A{'}$ is newly defined as the UE-specific parameter used to determine $\rho'_A$ for the r-ABS as in the aforementioned embodiment 1-1. $P_B{'}$ is newly defined as a parameter (i.e. subframe-specific parameter) applied only to the r-ABS and used to determine $\rho'_B$ in the r-ABS. For example, eNB1 may transmit $\delta_{power-offset}{'}$, $P_A$ and $P_B{'}$ to eNB2 through the link (e.g. X2 interface) between eNB1 and eNB2. Accordingly, eNB2 can determine $\rho'_A$ and $\rho'_B$ with respect to the r-ABS.

According to embodiment 1-3, $P_A{'}$ may be set such that PDSCH EPRE determined by $\rho'_A$ in the r-ABS corresponds to low Tx power as shown in FIG. 13. The subframe-specific parameter $P_B{'}$ for the r-ABS may be set such that $\rho'_B/\rho'_A=1$. When the UE-specific parameter $P_A{'}$ and the subframe-specific parameter $P_B{'}$ for the r-ABS are separately defined, flexible Tx power allocation for the r-ABS can be achieved.

In addition, $\rho'_B/\rho'_A$ may be pre-shared by eNB1 and UE in the form of a table according to the subframe-specific parameter $P_B{'}$ for the r-ABS and antenna ports, similarly to Table 3. The UE-specific parameter $P_A{'}$ and the subframe-specific parameter $P_B{'}$ for the r-ABS may be transmitted in extended forms of the UE-specific parameter $P_A$ and the cell-specific parameter $P_B$ for the normal subframe.

A description will be given of a method of exchanging the "r-ABS pattern information" and "r-ABS Tx power indication information" described in the aforementioned embodiments.

Embodiment 1-4

ABS power information is not defined in the ABS IE shown in Table 1. Accordingly, the present embodiment proposes addition of the ABS power information to the ABS IE to support the r-ABS.

For example, eNB1 can transmit Tx power information on each ABS to eNB2 in an ABS set. Here, different Tx power levels may be set for ABSs in the ABS set.

Specifically, while subframes (i.e. ABS set) set to ABSs are indicated using a bitmap in the ABS pattern information field defined in the conventional ABS IE, an ABS power information field proposed by the present invention may be indicated as a subset of subframes set to ABSs in the ABS pattern information field. Tx power corresponding to a subframe indicated by '0' in an ABS power information bitmap may be set to TxP0 and Tx power corresponding to a subframe indicated by '1' in the ABS power information bitmap may be set to TxP1.

In addition, eNB1 can signal, to eNB2, information on a plurality of Tx power values (e.g. TxP0 and TxP1) set for ABSs thereof. Information on a plurality of Tx power values that may be set for ABSs is preferably included in the ABS information IE.

When TxP0 corresponds to Tx power of 0 and TxP1 corresponds to reduced Tx power, a subframe indicated by '0' in the ABS power information bitmap may correspond to a z-ABS and indicate data Tx power of 0 and a subframe indicated by '1' in the ABS power information bitmap may correspond to an r-ABS and indicate Tx power of TxP1. That is, the r-ABS pattern information and r-ABS power indication information may be signaled through the ABS power information field.

Embodiment 1-5

In another embodiment relating to the aforementioned ABS power information field, eNB1 may indicate scheduling intention for each ABS in an ABS set.

For example, data other than essential channels/signals such as a CRS, PBCH, SCH, etc. is not transmitted in a z-ABS. That is, a PDCCH and/or a PDSCH for uplink or downlink unicast data scheduling of an eNB are not transmitted in the z-ABS. Accordingly, it is possible to consider the eNB as having no scheduling intention in the z-ABS.

The PDCCH and/or PDSCH for uplink or downlink unicast data scheduling may be transmitted with reduced Tx power in an r-ABS. Accordingly, it is possible to consider the eNB as having scheduling intention in the r-ABS.

Specifically, eNB1 can set an ABS set, set the z-ABS and r-ABS respectively to '0' and '1' in the ABS set and perform transmission to eNB2.

Accordingly, eNB2 can recognize which subframe is a z-ABS or r-ABS in the ABS set.

TABLE 5

| >>ABS Power Info | M | BIT STRING (SIZE(40)) | Each position in the bitmap represents a subframe, for which value "1" indicates 'ABS that has been designated in ABS Pattern Info and indicate the intension of DL/UL unicast scheduling with reduced power and the value 0 is used for all other subframes. The pattern represented by the bitmap is a subset of, or the same as, the corresponding ABS Pattern Info IE conveyed in the LOAD INFORMATION message from the eNB$_1$. |
|---|---|---|---|

In addition, a Tx power value corresponding to an ABS (i.e. r-ABS) for which the eNB has scheduling intention may be signaled. The Tx power value in the r-ABS may be added to the ABS IE.

Embodiment 1-6

When Tx power in an ABS is ABS pattern (or ABS set)-specifically given, signaling overhead can be remarkably reduced. For example, when the same Tx power is applied to all ABS belonging to one ABS set (i.e. when Tx power is not changed in the ABS set), there is no need to signal Tx power per ABS. Accordingly, ABS power information may be provided by defining an indicator that indicates a specific value from among Tx power values that may be set for ABSs.

For example, eNB1 can signal a plurality of Tx power values (e.g. TxP0 and TxP1) applicable to ABSs to eNB2, set a 1-bit indicator related to the corresponding ABS set to '0' or '1' and transmit the indicator to eNB2, thereby informing eNB2 that a Tx power value applied to the corresponding ABS set is TxP0 or TxP1. The Tx power indicator may be added to the ABS IE.

When the indicator indicates TxP0 for a specific ABS set and TxP0 indicates Tx power of 0, this means that all ABSs in the ABS set are set to the z-ABS. When the indicator indicates TxP1 for a specific ABS set and TxP1 indicates reduced Tx power, this means that all ABSs in the ABS set are set to the r-ABS. In this case, Tx power for the r-ABS is set to TxP1.

Embodiment 1-7

Figure 14:
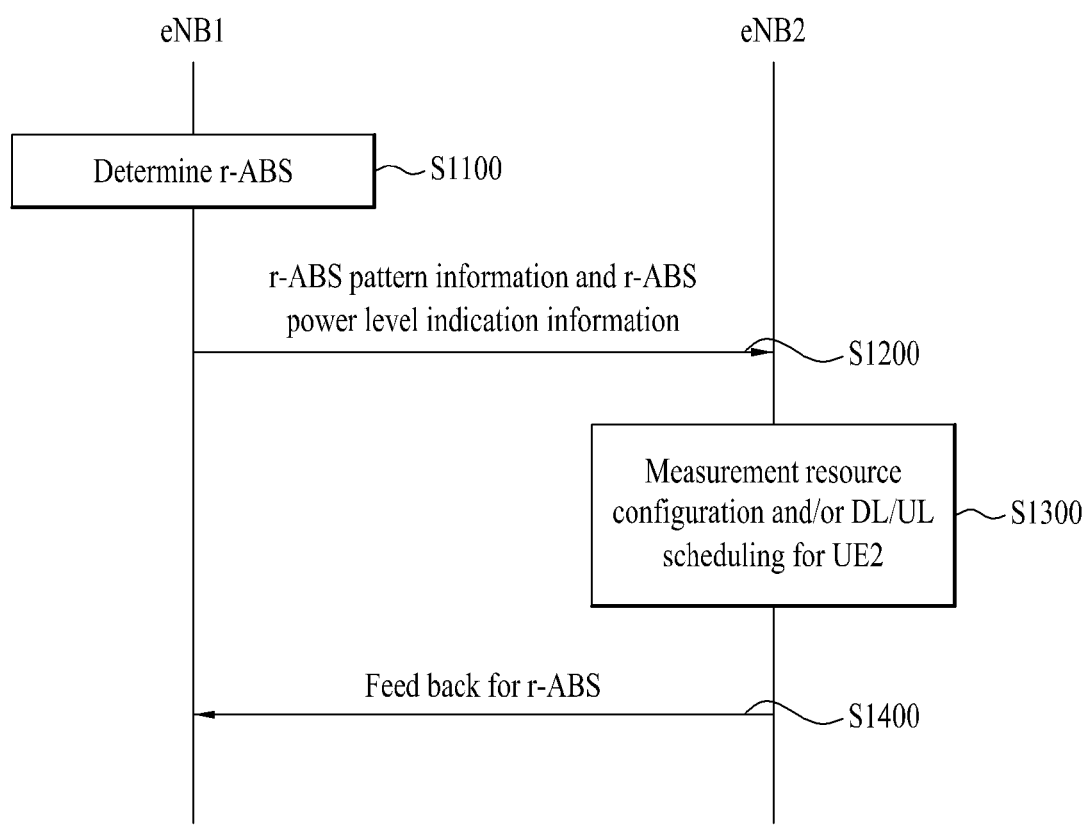
FIG. 14 is a flowchart illustrating a method for transmitting r-ABS related information between eNBs according to an embodiment of the present invention.

FIG. 14 is a flowchart illustrating a method for transmitting r-ABS related information between eNBs according to an embodiment of the present invention. In the example of FIG. 14, information exchange between eNB1 and eNB2 may be performed through X2 signaling.

In step S1100, eNB1 may determine an r-ABS from among a plurality of downlink subframes.

In step S1200, eNB1 may transmit r-ABS pattern information and r-ABS power indication information to eNB2. The r-ABS pattern information and r-ABS power indication information may be configured by a combination of one, two or more of the examples above-described in embodiments 1-1 to 1-6. For example, information indicating the r-ABS may be defined as the r-ABS pattern information using a bitmap and may be transmitted to eNB2 through X2 signaling. The r-ABS power indication information may include at least one combination of UE-specific parameter PA with respect to the r-ABS, subframe-specific parameter $P_B$' with respect to the r-ABS and Tx power offset information power-offset' with respect to the r-ABS. In addition, the r-ABS pattern information and r-ABS power indication information may be represented as one bitmap. Furthermore, the r-ABS power indication information may be configured in the form of a bitmap or an indicator which indicates a specific value from among predetermined Tx power values. This r-ABS configuration information (i.e. r-ABS pattern information and r-ABS power indication information) may be added to the ABS IE and defined as a new X2 signaling message.

In step S1300, eNB2 may set measurement resources for a UE (UE2) served by eNB2 on the basis of the r-ABS pattern information and r-ABS power indication information. For example, eNB2 can set such that UE2 performs restricted measurement on CSI or RLM/RRM in a subframe set which is set to the r-ABS by eNB1 or other subframe sets.

In addition, eNB2 may consider resources (i.e. resources set to the r-ABS by eNB 1) which are less interfered by eNB1 during downlink/uplink (DL/UL) scheduling for UE2. For example, eNB2 can schedule DL/UL data transmission in a resource region set to the r-ABS by eNB1, for UE2 close to the center of the cell corresponding to the eNB2. For UE2 located at the cell edge of eNB2, eNB2 can schedule DL/UL data transmission in a resource region set to the z-ABS by eNB1 since resources may suffer interference from eNB1 even in subframes set to the r-ABS.

In step S1400, eNB2 may transmit feedback with respect to r-ABS configuration to eNB1 on the basis of a measurement result reported by UE2 or whether DL/UL data transmission has been successfully performed.

Here, feedback information transmitted from eNB2 to eNB1 may be a signal that allows eNB1 to increase Tx power in the r-ABS or a signal that requests eNB2 to decrease Tx power in the r-ABS. For example, when the measurement result of UE2 exceeds a predetermined threshold or DL/UL data transmission is performed without error, information indicating increase of the Tx power in the r-ABS of eNB1 may be signaled. When the measurement result of UE2 is less than the predetermined threshold or an error is generated during DL/UL data transmission, information for requesting eNB1 to decrease the Tx power in the r-ABS may be signaled. Otherwise, information for requesting eNB1 to maintain the current r-ABS Tx power may be signaled.

In addition, the feedback information transmitted from eNB2 to eNB1 may include information for requesting eNB1 to increase or decrease the number of r-ABSs from among downlink subframes of eNB1, information for requesting eNB1 to maintain the current number of r-ABSs, information for requesting eNB1 to adjust positions of r-ABSs in the time resources and/or frequency resources or information for requesting eNB1 to maintain the current state. The feedback information may be signaled through the usable ABS pattern information field of the ABS status IE shown in Table 2. Otherwise, a new field may be additionally defined in the ABS status UE for the feedback information. In addition, a new X2 signaling message may be defined for the feedback information.

Embodiment 2

Information with respect to r-ABS configuration may be provided to a UE served by eNB1 from eNB1 that configures the r-ABS. For example, eNB1 can provide "r-ABS pattern information" and "r-ABS power indication information" to the UE using higher layer (e.g. RRC (radio resource control) layer) signaling. The r-ABS pattern information and r-ABS power indication information provided to the UE may be configured in the forms corresponding to embodiments 1-1 to 1-6 of the present invention. That is, while the r-ABS pattern information and r-ABS power indication information are transmitted from eNB1 to eNB2 through X2 signaling in embodiment 1, the information defined in embodiment 1 may be transmitted through higher layer signaling from an eNB to a UE. Accordingly, the r-ABS may be semi-statically set for the UE served by eNB1 and the UE may correctly perform measurement and/or data reception in the r-ABS on the basis of the r-ABS pattern information and r-ABS power indication information.

Figure 15:
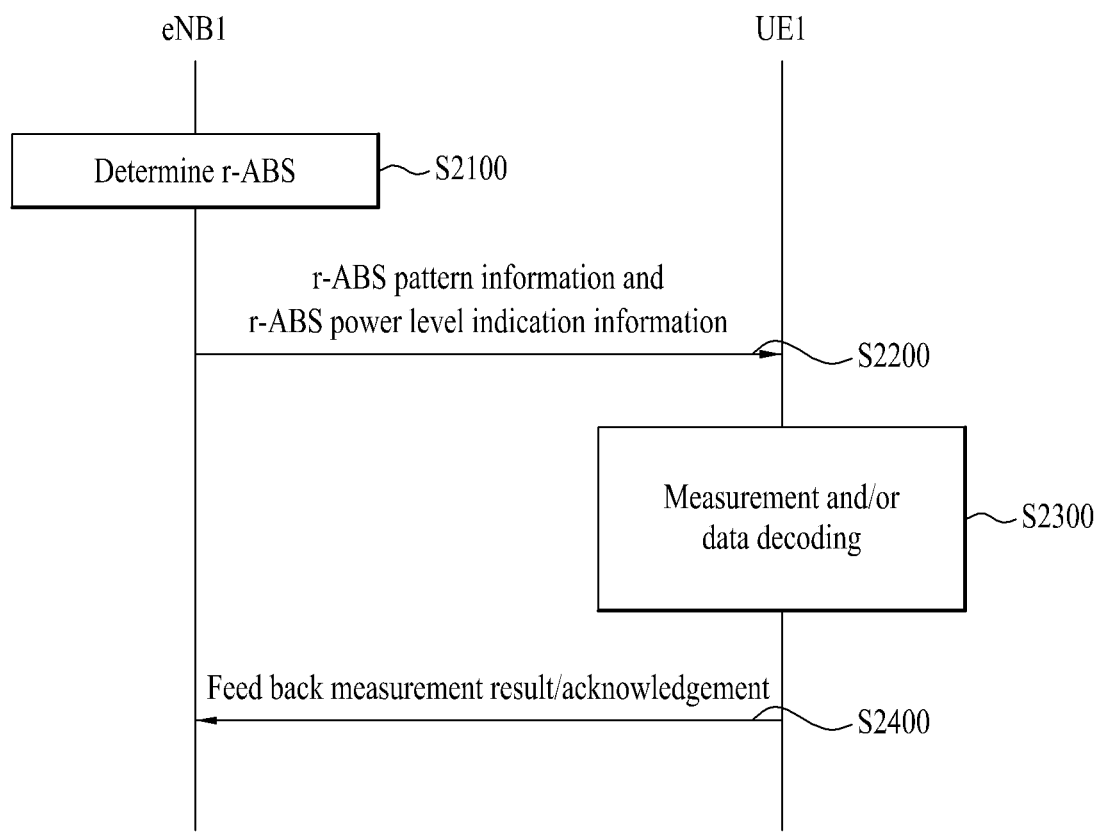
FIG. 15 is a flowchart illustrating a method for transmitting r-ABS related information between an eNB that configures an r-ABS and a UE according to an embodiment of the present invention.

FIG. 15 is a flowchart illustrating a method for transmitting r-ABS related information between an eNB that configures an r-ABS and a UE according to an embodiment of the present invention.

In step S2100, eNB1 may determine an r-ABS from among a plurality of downlink subframes.

In step S2200, eNB1 may transmit r-ABS pattern information and r-ABS power indication information to a UE (UE 1) served by eNB 1. Here, information indicating the r-ABS may be defined as the r-ABS pattern information using a bitmap and transmitted to the UE through higher layer signaling. The r-ABS power indication information may include at least one combination of UE-specific parameter $P_A'$ with respect to the r-ABS, subframe-specific parameter $P_B'$ with respect to the r-ABS and Tx power offset information $\delta_{power-offset}'$ with respect to the r-ABS. In addition, the r-ABS power indication information may be configured in the form of a bitmap or an indicator which indicates a specific value from among predetermined Tx power values. eNB1 may transmit the r-ABS pattern information and r-ABS power indication information to UE1 served thereby and enable UE1 to use the r-ABS pattern information and r-ABS power indication information for channel measurement and data decoding. Particularly, eNB1 may instruct UE1 to perform restricted channel measurement on the basis of the r-ABS pattern information and r-ABS power indication information. To achieve this, eNB1 may signal an additional subframe set (i.e. resources for restricted measurement) to UE1.

In step S2300, UE1 may perform measurement (CSI, RLM or RRM measurement) on the r-ABS and/or decoding of downlink data transmitted in the r-ABS on the basis of the r-ABS pattern information and r-ABS power indication information.

In step S2400, UE1 may report a downlink measurement result and/or acknowledgement (i.e. decoding result with respect to the downlink data) to eNB1.

As described above, UE1 may receive downlink data in the subframe set to the r-ABS. Here, strong interference may be applied to UE1 from a neighboring cell in the r-ABS. In this case, UE1 may restrict the range of quantization of a signal received in the r-ABS. Signal quantization is to represent so many input values such as analog signals as a specific representative value. In the case of wide quantization range, a small variation in a received signal can be ignored. Accordingly, when a desired signal is received with low Tx power and a strong interference signal is accompanied, it is necessary to perform efficient quantization on the signal except for the interference signal.

According to the present invention, UE1 may perform quantization only within a Tx power range corresponding to r-ABS Tx power and exclude quantization in other ranges when a signal received in the r-ABS is quantized in an analog-to-digital conversion (ADC) process, thereby reducing the influence of an interference signal. For example, UE1 can restrict minimum and maximum ranges of linear quantization in consideration of r-ABS Tx power. In addition, a compandor may be used to set the quantization range to the r-ABS Tx power, to thereby reduce the interference signal.

Embodiment 3

ICIC operation performed between an eNB, which receives r-ABS configuration information (e.g. r-ABS pattern information and r-ABS power indication information) of a neighboring cell, and a UE served by the eNB will now be described in the present embodiment.

Figure 16:
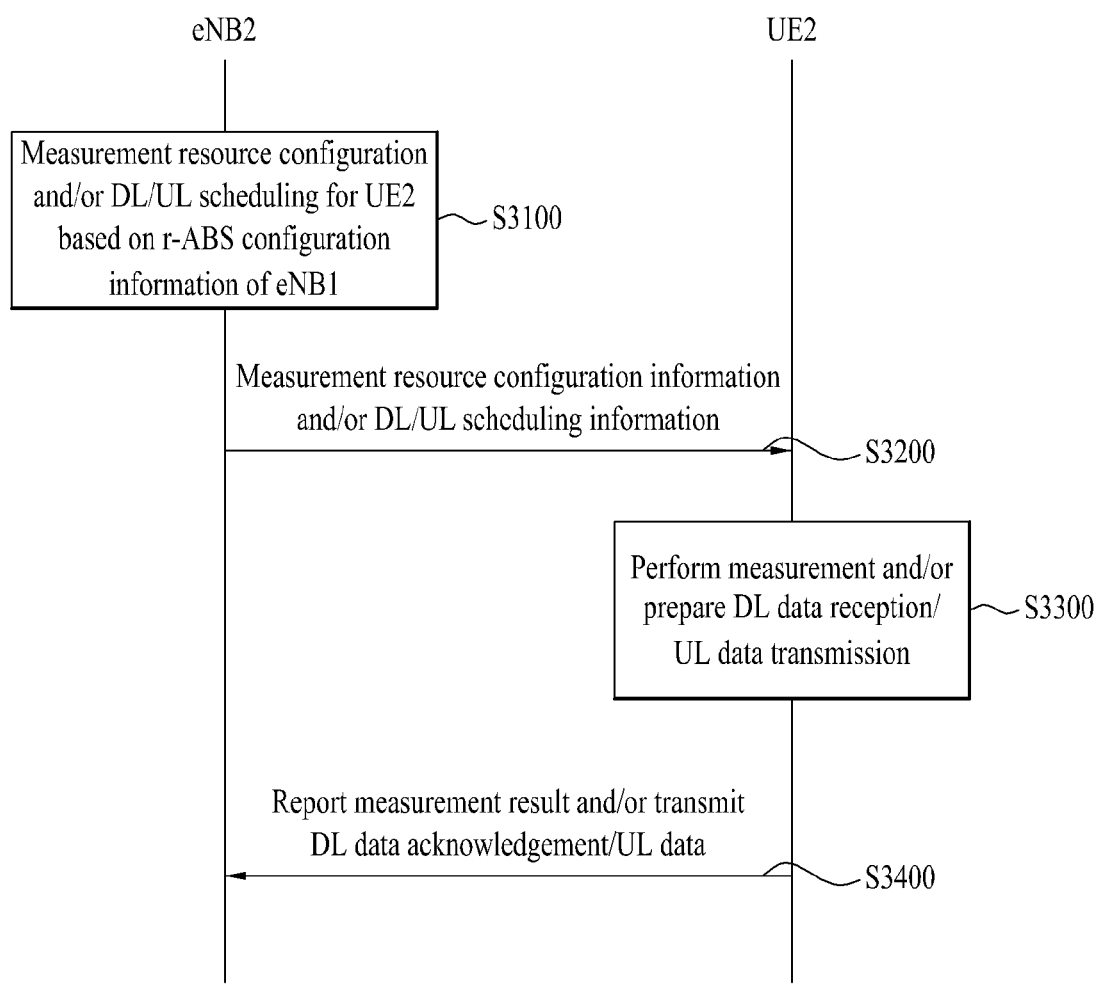
FIG. 16 is a flowchart illustrating operations performed between an interfered cell (eNB2) and a UE (UE2) served by the interfered cell according to an embodiment of the present invention.

FIG. 16 illustrates a flowchart illustrating operations between an interfered cell (eNB2) and a UE (UE2) served by the interfered cell according to an embodiment of the present invention.

In step S3100, eNB2 may set measurement resources for UE2 and/or perform DL/UL scheduling for UE2 on the basis of r-ABS configuration information (e.g. r-ABS pattern information and r-ABS power indication information) of eNB1. In addition, eNB2 may additionally consider z-ABS configuration information (e.g. z-ABS pattern information)

of eNB1 along with the r-ABS configuration information of eNB1 for measurement resource setting and/or DL/UL scheduling for UE2.

For example, eNB2 may set the measurement resources for UE2 on the basis of the r-ABS pattern information and r-ABS power indication information of eNB1. Specifically, eNB may set such that UE2 performs restricted measurement on CSI or RLM/RRM in a subframe set which is set by eNB1 to the r-ABS or in other subframe sets.

In addition, eNB2 may consider resources (i.e. resources set to the r-ABS by eNB1) which are less interfered by eNB1 during DL/UL scheduling for UE2. For example, eNB2 can schedule DL/UL data transmission in a resource region set to the r-ABS by eNB1, for UE2 close to the center of the cell corresponding to the eNB2. For UE2 located at the cell edge of eNB2, eNB2 can schedule DL/UL data transmission in a resource region set to the z-ABS by eNB1 on the basis of the z-ABS configuration information of eNB1 since resources may suffer interference from eNB1 even in subframes set to the r-ABS by eNB 1.

In step S3200, eNB2 may provide measurement resource configuration information and/or DL/UL scheduling information to UE2. In addition, eNB2 may provide the r-ABS configuration information transmitted from eNB1 to UE2 through higher layer signaling.

In step S3300, UE2 may perform measurement of the measurement resources indicated by eNB2 and generate a measurement result. In addition, UE2 may prepare for DL data reception or UL data transmission according to the scheduling information. Furthermore, UE2 may use the r-ABS configuration information received from eNB2 to receive downlink data. For example, UE2 can use the r-ABS power indication information to remove the influence of interference from the r-ABS. Specifically, when UE2 receives downlink data in the subframe set to the r-ABS by eNB1, UE2 may determine an interference level per symbol using Tx power information per symbol of the r-ABS and apply MMSE (minimum mean square error) reception scheme in consideration of the determined interference level.

In S3400, UE2 may reports the measurement result or acknowledgement for DL data reception or perform UL data transmission according to UL scheduling indication.

The aforementioned various embodiments of the present invention may be independently applied or two or more thereof may be simultaneously applied.

Furthermore, while configuration of the r-ABS is exemplified in the above description, the principle of the present invention is equally applicable to a new transmission resource setting scheme to which the conventional Tx power allocation scheme is not applied. That is, the scope of the present invention is not limited to the aforementioned example of configuring the r-ABS and may include a method for exchanging signaling with respect to a new transmission resource pattern and/or a new Tx power allocation scheme applied to the new transmission resource between eNBs and a method for signaling the new transmission resource pattern and/or the Tx power allocation scheme to a UE by an eNB.

Figure 17:
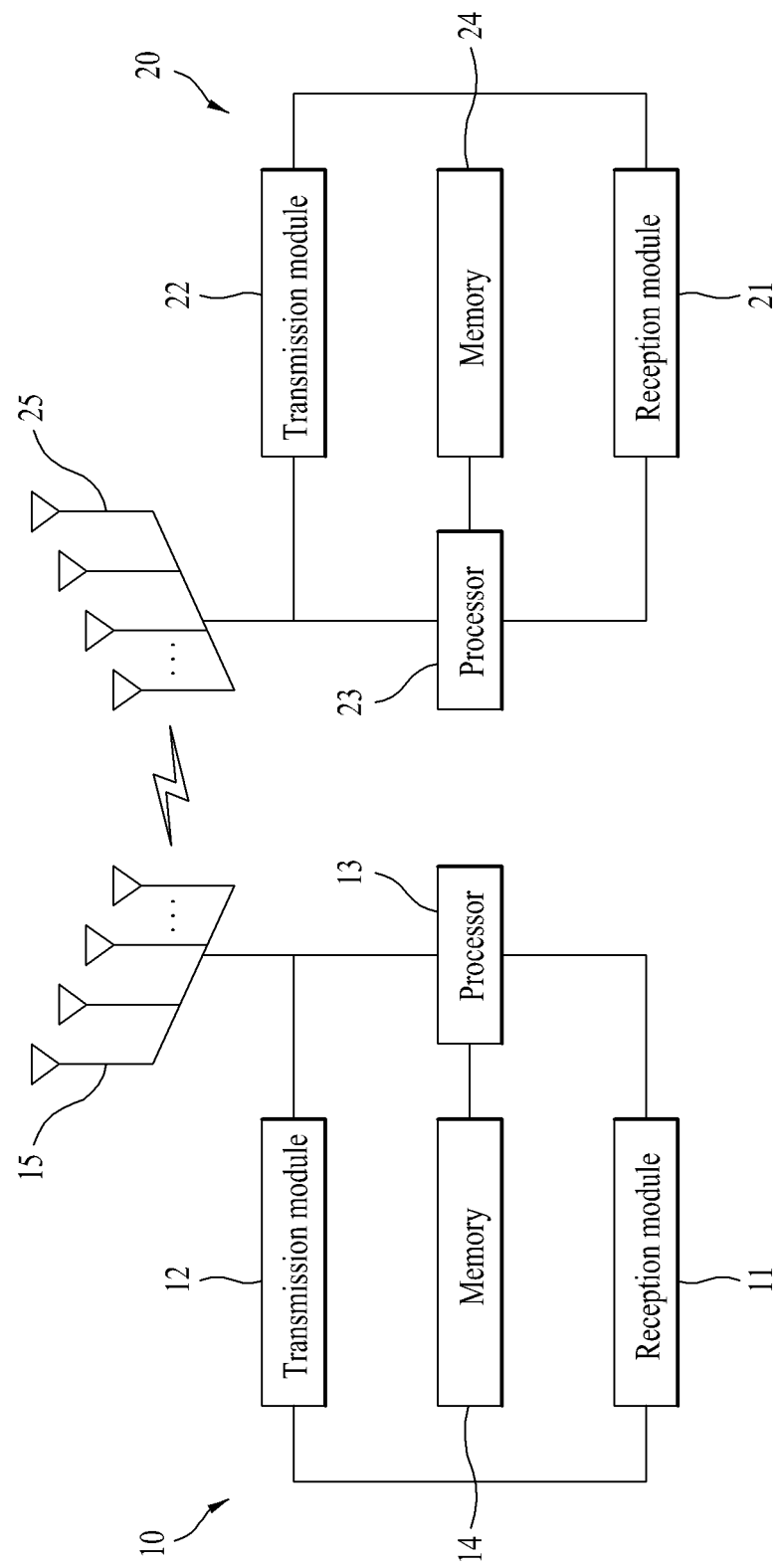
FIG. 17 illustrates configurations of an eNB and a UE according to an embodiment of the present invention.

FIG. 17 illustrates configurations of an eNB and a UE according to an embodiment of the present invention.

Referring to FIG. 17, an eNB 10 may include a reception module 11, a transmission module 12, a processor 13, a memory 14 and a plurality of antennas 15. The plurality of antennas refers to an eNB supporting MIMO transmission/reception. The reception module 11 may receive signals, data and information from an external device and the transmission module 12 may transmit signals, data and information to the external device. The processor 13 may control overall operation of the eNB 10.

An eNB of a first cell according to an embodiment of the present invention may be configured to transmit r-ABS configuration information of the first cell to a second cell. The processor 13 of the eNB of the first cell may be configured to transmit, to the second cell through the transmission module 12, r-ABS pattern information that indicates an r-ABS set by the first cell from among a plurality of subframes and r-ABS power indication information that indicates PDSCH Tx power of the first cell in the r-ABS. In addition, the processor 13 of the eNB of the first cell may be configured to receive feedback information on use of the r-ABS from the second cell through the reception module 11. Furthermore, the processor 13 of the eNB of the first cell may be configured to transmit the r-ABS pattern information and the r-ABS power indication information to a first UE served by the first cell through the transmission module 12.

An eNB of the second cell according to another embodiment of the present invention may be configured to receive r-ABS configuration information of the first cell. The processor 13 of the eNB of the second cell may be configured to receive, from the first cell through the reception module 11, the r-ABS pattern information that indicates the r-ABS set by the first cell from among a plurality of subframes and the r-ABS power indication information that indicates PDSCH Tx power of the first cell in the r-ABS. Here, the PDSCH Tx power of the first cell may be set to Tx power lower than that of the normal subframe. The processor 13 of the eNB of the second cell may be configured to perform at least one of measurement resource configuration, downlink scheduling and uplink scheduling for a second UE served by the second cell on the basis of the r-ABS pattern information and the r-ABS power indication information. In addition, the processor 13 of the eNB of the second cell may be configured to transmit information on at least one of measurement resource configuration, downlink scheduling and uplink scheduling to the second UE through the transmission module 12. Furthermore, the processor 13 of the eNB of the second cell may be configured to transmit the r-ABS pattern information and the r-ABS power indication information to the second UE served by the second cell through the second transmission module 12. Moreover, the processor 13 of the eNB of the second cell may be configured to transmit feedback information about use of the r-ABS to the first cell through the transmission module 12.

The processor 13 of the eNB 10 may process information received by the eNB 10, information transmitted from the eNB 10 to the outside, etc. The memory 14 may store processed information for a predetermined time and may be replaced by a component such as a buffer (not shown).

Referring to FIG. 17, the UE 20 according to an embodiment of the present invention may include a reception module 21, a transmission module 22, a processor 23, a memory 24 and a plurality of antennas 25. The plurality of antennas 25 refers to a UE supporting MIMO transmission/reception. The reception module 21 may receive signals, data and information from an external device and the transmission module 22 may transmit signals, data and information to the external device. The processor 23 may control overall operation of the UE 20.

The processor 23 of a first UE served by the first cell according to an embodiment of the present invention may be configured to receive, from the first cell through the reception module 21, the r-ABS pattern information that indicates the r-ABS set by the first cell from among a plurality of subframes and the r-ABS power indication information that indicates PDSCH Tx power of the first cell in the r-ABS. In addition, the processor 23 of the first UE may be configured to receive measurement resources and/or scheduling information, set on the basis of the r-ABS pattern information and the r-ABS power indication information, from the first cell and perform measurement and/or DL data reception/UL data transmission.

The processor 23 of a second UE served by the second cell according to another embodiment of the present invention may be configured to receive, from the second cell through the reception module 21, the r-ABS pattern information that indicates the r-ABS set by the first cell from among a plurality of subframes and the r-ABS power indication information that indicates PDSCH Tx power of the first cell in the r-ABS. In addition, the processor 23 of the second UE may receive, from the second cell, measurement resources and/or scheduling information, set by the second cell on the basis of the r-ABS pattern information and the r-ABS power indication information of the first cell, and perform measurement and/or DL data reception/UL data transmission.

The processor 23 of the UE 20 may process information received by the UE 20, information transmitted from the UE 20 to the outside, etc. The memory 24 may store processed information for a predetermined time and may be replaced by a component such as a buffer (not shown).

In the aforementioned configurations of the eNB and the UE, the above-described various embodiments of the present invention are independently applicable or two or more thereof are simultaneously applicable and redundant description is omitted for clarity.

In FIG. 17, the description of the eNB may be equally applied to a relay corresponding to a downlink transmitting entity or an uplink reception entity and the description of the UE may be equally applied to a relay corresponding to a downlink reception entity or an uplink transmission entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting reduced power-almost blank subframe (r-ABS) configuration information at a first cell by an eNodeB (eNB) to a second cell, the method comprising:
   transmitting, to the second cell, r-ABS pattern information for indicating an r-ABS set by the first cell from among a plurality of subframes, and r-ABS power indication information for indicating transmit (Tx) power of a physical downlink shared channel (PDSCH) of the first cell in the r-AB S,
   wherein the PDSCH Tx power of the first cell is set to Tx power lower than that with respect to a normal subframe, and
   wherein the r-ABS power indication information includes a user equipment specific parameter $P_A$, a subframe specific parameter $P_B$, and an offset value for the r-ABS $\delta_{power-offset}'$,
   wherein a first ratio of a cell-specific reference signal (CRS) energy per resource element (EPRE) to PDSCH EPRE on orthogonal frequency division multiplex (OFDM) symbols on which a CRS is not transmitted in downlink subframes other than the r-ABS is determined based on the $P_A$,
   wherein a second ratio of the CRS EPRE to the PDSCH EPRE on OFDM symbols on which the CRS is transmitted in downlink subframes including the r-ABS is determined based on the $P_B$, and
   wherein a third ratio of the CRS EPRE to PDSCH EPRE on OFDM symbols on which the CRS is transmitted in the r-ABS is determined based on the first ratio and the offset value for the r-ABS.

2. The method according to claim 1, wherein the r-ABS pattern information is set as a subset of an ABS pattern of the first cell.

3. The method according to claim 2, wherein the r-ABS pattern information and the r-ABS power indication information are composed of bitmap information indicating a first Tx power value and a second Tx power value respectively applied to ABSs belonging to the ABS pattern.

4. The method according to claim 2, wherein the r-ABS pattern information is composed of bitmap information indicating whether the first cell has scheduling intention for each ABS belonging to the ABS pattern.

5. The method according to claim 2, wherein the r-ABS power indication information is configured in the form of an indicator indicating one of a first Tx power value and a second Tx power value when the same Tx power is applied to all ABSs belonging to the ABS pattern.

6. The method according to claim 1, further comprising receiving feedback information about use of the r-ABS from the second cell.

7. The method according to claim 6, wherein the feedback information includes at least one of information for requesting Tx power of the first cell in the r-ABS to increase or decrease and information for requesting the number of r-ABSs to increase or decrease.

8. The method according to claim 1, further comprising transmitting the r-ABS pattern information and the r-ABS power indication information to a first user equipment (UE) served by the first cell through higher layer signaling.

9. A method for receiving, at a second cell by an eNodeB (eNB), reduce power-Almost Blank Subframe (r-ABS) configuration information of a first cell, the method comprising:
receiving, from the first cell, r-ABS pattern information for indicating an r-ABS set by the first cell from among a plurality of subframes, and r-ABS power indication information for indicating physical downlink shared channel (PDSCH) transmit (Tx) power of the first cell in the r-ABS,
wherein the r-ABS power indication information includes a user equipment specific parameter $P_A$, a subframe specific parameter $P_B$, and an offset value for the r-ABS $\delta_{power-offset}$,
wherein a first ratio of a cell-specific reference signal (CRS) energy per resource element (EPRE) to PDSCH EPRE on orthogonal frequency division multiplex (OFDM) symbols on which a CRS is not transmitted in downlink subframes other than the r-ABS is determined based on the $P_A$,
wherein a second ratio of the CRS EPRE to the PDSCH EPRE on OFDM symbols on which the CRS is transmitted in downlink subframes including the r-ABS is determined based on the $P_B$, and
wherein a third ratio of the CRS EPRE to PDSCH EPRE on OFDM symbols on which the CRS is transmitted in the r-ABS is determined based on the first ratio and the offset value for the r-ABS.

10. The method according to claim 9, further comprising:
performing at least one of measurement resource configuration, downlink scheduling and uplink scheduling for a second user equipment (UE) served by the second cell based on the r-ABS pattern information and the r-ABS power indication information; and
transmitting information on at least one of the measurement resource configuration, downlink scheduling and uplink scheduling to the second UE.

11. The method according to claim 9, further comprising transmitting the r-ABS pattern information and the r-ABS power indication information to the second UE served by the second cell through higher layer signaling.

12. An eNodeB (eNB) of a first cell for transmitting reduce power-Almost Blank Subframe (r-ABS) configuration information of the first cell to a second cell, the eNB comprising:
an antenna;
a memory;
a transmitter for transmitting a signal to an external device;
a receiver for receiving a signal from an external device; and
a processor for controlling the eNB,
wherein the processor is configured to transmit, to the second cell through the transmission module, r-ABS pattern information for indicating an r-ABS set by the first cell from among a plurality of subframes, and r-ABS power indication information for indicating physical downlink shared channel (PDSCH) transmit (Tx) power of the first cell in the r-ABS,
wherein the PDSCH Tx power of the first cell is set to Tx power lower than that with respect to a normal subframe, and
wherein the r-ABS power indication information includes a user equipment specific parameter $P_A$, a subframe specific parameter $P_B$, and an offset value for the r-ABS $\delta_{power-offset}$,
wherein a first ratio of a cell-specific reference signal (CRS) energy per resource element (EPRE) to PDSCH EPRE on orthogonal frequency division multiplex (OFDM) symbols on which a CRS is not transmitted in downlink subframes other than the r-ABS is determined based on the $P_A$,
wherein a second ratio of the CRS EPRE to the PDSCH EPRE on OFDM symbols on which the CRS is transmitted in downlink subframes including the r-ABS is determined based on the $P_B$, and
wherein a third ratio of the CRS EPRE to PDSCH EPRE on OFDM symbols on which the CRS is transmitted in the r-ABS is determined based on the first ratio and the offset value for the r-ABS.

13. An eNodeB (eNB) of a second cell for receiving reduce power-Almost Blank Subframe (r-ABS) configuration information of a first cell, the eNB comprising:
an antenna;
a memory;
a receiver for receiving a signal from an external device;
a transmitter for transmitting a signal to an external device; and
a processor for controlling the eNB,
wherein the processor is configured to receive, from the first cell through the reception module, r-ABS pattern information for indicating an r-ABS set by the first cell from among a plurality of subframes, and r-ABS power indication information for indicating physical downlink shared channel (PDSCH) transmit (Tx) power of the first cell in the r-ABS,
wherein the PDSCH Tx power of the first cell is set to Tx power lower than that with respect to a normal subframe, and
wherein the r-ABS power indication information includes a user equipment specific parameter $P_A$, a subframe specific parameter $P_B$, and an offset value for the r-ABS $\delta_{power-offset}$,
wherein a first ratio of a cell-specific reference signal (CRS) energy per resource element (EPRE) to PDSCH EPRE on orthogonal frequency division multiplex (OFDM) symbols on which a CRS is not transmitted in downlink subframes other than the r-ABS is determined based on the $P_A$,
wherein a second ratio of the CRS EPRE to the PDSCH EPRE on OFDM symbols on which the CRS is transmitted in downlink subframes including the r-ABS is determined based on the $P_B$, and wherein a third ratio of the CRS EPRE to PDSCH EPRE on OFDM symbols on which the CRS is transmitted in the r-ABS is determined based on the first ratio and the offset value for the r-ABS.

* * * * *